US012793513B2

(12) United States Patent
Huke et al.

(10) Patent No.: US 12,793,513 B2
(45) Date of Patent: Nov. 10, 2026

(54) LIVE EVENT INFORMATION DISPLAY METHOD, SYSTEM, AND APPARATUS

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Joseph Bodkin, Quincy, MA (US); Harrison Grant, Simi Valley, CA (US); Michael D'Andrea, Burlington, VT (US); Sean Lee, Washington, DC (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 18/376,193

(22) Filed: Oct. 3, 2023

(65) Prior Publication Data

US 2024/0046763 A1 Feb. 8, 2024

Related U.S. Application Data

(63) Continuation of application No. PCT/US2023/065568, filed on Apr. 10, 2023.
(Continued)

(51) Int. Cl.
*G07F 17/32* (2006.01)
*G06F 16/23* (2019.01)
(Continued)

(52) U.S. Cl.
CPC ...... *G07F 17/3288* (2013.01); *G06F 16/2379* (2019.01); *G06F 16/24568* (2019.01);
(Continued)

(58) Field of Classification Search
CPC ........... G07F 17/3288; G06F 16/24568; G06F 16/26; G06Q 50/34; H04N 21/2187;
(Continued)

(56) References Cited

U.S. PATENT DOCUMENTS 6,266,100 B1 * 7/2001 Gloudemans ........ H04N 5/2723 348/584
6,466,275 B1 * 10/2002 Honey .................. H04N 5/222 348/E5.022
(Continued)

OTHER PUBLICATIONS

International Search Report mailed Jul. 31, 2023, in corresponding International Application No. PCT/US23/65568, 2 pages.
(Continued)

*Primary Examiner* — Kang Hu
(74) *Attorney, Agent, or Firm* — Maier & Maier, PLLC

(57) ABSTRACT

A method, system, and apparatus for generating probabilities, for example for displaying on a video feed, which may be generated or adjusted using machine learning and/or artificial intelligence. One embodiment includes a method for generating and adjusting probabilities. the generated probabilities in order to create and display probability graphics on a display device. The graphics may be generated and/or updated using artificial intelligence or machine learning. Display information may be updated in real-time as changes are made in the game (e.g. a player injury, substitutions, changing weather conditions, etc.). The changes may be detected by a detection system on the field, attached to players or equipment.

20 Claims, 31 Drawing Sheets

Related U.S. Application Data

(60) Provisional application No. 63/477,892, filed on Dec. 30, 2022, provisional application No. 63/335,368, filed on Apr. 27, 2022, provisional application No. 63/334,275, filed on Apr. 25, 2022, provisional application No. 63/332,744, filed on Apr. 20, 2022, provisional application No. 63/332,330, filed on Apr. 19, 2022, provisional application No. 63/332,333, filed on Apr. 19, 2022, provisional application No. 63/331,951, filed on Apr. 18, 2022, provisional application No. 63/331,339, filed on Apr. 15, 2022, provisional application No. 63/331,338, filed on Apr. 15, 2022, provisional application No. 63/328,858, filed on Apr. 8, 2022.

(51) Int. Cl.

| | |
|---|---|
| ***G06F 16/2455*** | (2019.01) |
| ***G06F 16/26*** | (2019.01) |
| ***G06Q 50/34*** | (2012.01) |
| ***H04N 21/2187*** | (2011.01) |
| ***H04N 21/234*** | (2011.01) |
| ***H04N 21/242*** | (2011.01) |
| ***H04N 21/266*** | (2011.01) |
| ***H04N 21/431*** | (2011.01) |
| ***H04N 21/854*** | (2011.01) |

(52) U.S. Cl.
CPC ............. *G06F 16/26* (2019.01); *G06Q 50/34* (2013.01); *H04N 21/2187* (2013.01); *H04N 21/23418* (2013.01); *H04N 21/242* (2013.01); *H04N 21/266* (2013.01); *H04N 21/4316* (2013.01); *H04N 21/854* (2013.01)

(58) Field of Classification Search
CPC ........... H04N 21/23418; H04N 21/242; H04N 21/266; H04N 21/4316; H04N 21/854
See application file for complete search history.

(56) References Cited

U.S. PATENT DOCUMENTS

| | | | | |
|---|---|---|---|---|
| 7,075,556 | B1 * | 7/2006 | Meier | H04N 5/272 348/E5.051 |
| 2002/0149617 | A1 * | 10/2002 | Becker | G16H 80/00 725/80 |
| 2003/0008711 | A1 * | 1/2003 | Corbo | G07F 17/3244 700/91 |
| 2003/0219708 | A1 * | 11/2003 | Janevski | H04N 21/4532 434/350 |
| 2013/0196753 | A1 * | 8/2013 | Miller | A63F 9/14 463/28 |
| 2017/0124473 | A1 * | 5/2017 | Lopez | H04L 67/75 |
| 2018/0001204 | A1 | 1/2018 | Eisenstein et al. | |
| 2020/0105107 | A1 | 4/2020 | Mckeever et al. | |
| 2020/0282314 | A1 | 9/2020 | Szeklinski et al. | |
| 2021/0217277 | A1 * | 7/2021 | Huke | G06N 20/00 |
| 2021/0241580 | A1 * | 8/2021 | Huke | G06F 1/163 |
| 2022/0270436 | A1 | 8/2022 | Khosla | |
| 2022/0343723 | A1 | 10/2022 | Huke et al. | |
| 2022/0383691 | A1 * | 12/2022 | Huke | G07F 17/3288 |
| 2022/0383704 | A1 | 12/2022 | Amaitis et al. | |

OTHER PUBLICATIONS

Written Opinion of the International Searching Authority mailed Jul. 31, 2023, in corresponding International Application No. PCT/US23/65568, 6 pages.

International Search Report and Written Opinion issued on Dec. 6, 2024, in corresponding International Application No. PCT/US2024/050894, 10 pages.

* cited by examiner

Fig 3

| Result Data | | | | | | | Situational Data | | | | | |
|---|---|---|---|---|---|---|---|---|---|---|---|---|
| Action ID | Offensive Team | Offensive Players | Quarter | Down | Distance | Result | Action ID | Team | Players | Quarter | Down | Distance |
| 130 | Patriots | Tom Brady, .... | 2nd | 1st | 10 | Pass | 131 | Patriots | Tom Brady ... | 2nd | 2nd | 5 |
| --- | --- | --- | --- | --- | --- | --- | --- | --- | --- | --- | --- | --- |
| --- | --- | --- | --- | --- | --- | --- | --- | --- | --- | --- | --- | --- |
| --- | --- | --- | --- | --- | --- | --- | --- | --- | --- | --- | --- | --- |

Fig 7

| Situational Data | | | | | | Parameters | | | | |
|---|---|---|---|---|---|---|---|---|---|---|
| Action ID | Team | Players | Quarter | Down | Distance | Event | Yards Gained | Temperature | Decibel Level | Players |
| 65 | Patriots | Tom Brady,.... | 2nd | 2nd | 5 | Run | 4 | 72 | 82 | Tom Brady, .... |
| 73 | Patriots | Tom Brady,.... | 2nd | 2nd | 5 | Pass | 8 | 34 | 114 | Tom Brady, .... |
| 94 | Patriots | Tom Brady,.... | 2nd | 2nd | 5 | Pass | 7 | 61 | 97 | Tom Brady, .... |
| 114 | Patriots | Tom Brady,.... | 2nd | 2nd | 5 | Run | 3 | 49 | 103 | Tom Brady, .... |
| ----- | ----- | ----- | ----- | ----- | ----- | ----- | ----- | ----- | ----- | ----- |
| ----- | ----- | ----- | ----- | ----- | ----- | ----- | ----- | ----- | ----- | ----- |
| ----- | ----- | ----- | ----- | ----- | ----- | ----- | ----- | ----- | ----- | ----- |

Fig 8

| Event Data | | | | | | | Sensor Data | | | |
|---|---|---|---|---|---|---|---|---|---|---|
| Team | Position | Player | Quarter | Down | To Gain | Play | Speed | Distance Traveled | Separation | Yards After Catch |
| Falcons | Wide Receiver | Julio Jones | 2nd | 3rd | 10 | Pass | 20 mph | 18 yards | 5 yards | 10 yards |
| Falcons | Wide Receiver | Julio Jones | 2nd | 3rd | 10 | Pass | 25 mph | 24 yards | 8 yards | 2 yards |
| Falcons | Wide Receiver | Julio Jones | 2nd | 3rd | 10 | Pass | 15 mph | 9 yards | 2 yards | 1 yard |
| Falcons | Wide Receiver | Julio Jones | 2nd | 3rd | 10 | Run | 12 mph | 10 yards | 1 yard | N/A |
| - | - | - | | - | - | - | - | - | - | - |
| - | - | - | | - | - | - | - | - | - | - |
| - | - | - | | - | - | - | - | - | - | - |
| Falcons | Wide Receiver | Calvin Ridley | 2nd | 3rd | 10 | Pass | 15 mph | 12 yards | 3 yards | 1 yard |
| Falcons | Wide Receiver | Calvin Ridley | 2nd | 3rd | 10 | Pass | 19 mph | 21 yards | 5 yards | 6 yards |
| Falcons | Wide Receiver | Calvin Ridley | 2nd | 3rd | 10 | Pass | 24 mph | 30 yards | 6 yards | 10 yards |
| Falcons | Wide Receiver | Calvin Ridley | 2nd | 3rd | 10 | Run | 5 mph | 4 yards | 0 yards | N/A |
| - | - | - | | - | - | - | - | - | - | - |
| - | - | - | | - | - | - | - | - | - | - |
| - | - | - | | - | - | - | - | - | - | - |
| Falcons | Wide Receiver | Justin Hardy | 2nd | 3rd | 10 | Pass | 15 mph | 15 yards | 4 yards | 4 yards |
| Falcons | Wide Receiver | Justin Hardy | 2nd | 3rd | 10 | Pass | 19 mph | 9 yards | 2 yards | 2 yards |
| Falcons | Wide Receiver | Justin Hardy | 2nd | 3rd | 10 | Pass | 24 mph | 5 yards | 1 yard | 0 yards |
| Falcons | Wide Receiver | Justin Hardy | 2nd | 3rd | 10 | Run | 2 mph | 1 yard | 0 yards | N/A |
| - | - | - | | - | - | - | - | - | - | - |
| - | - | - | | - | - | - | - | - | - | - |
| - | - | - | | - | - | - | - | - | - | - |

Fig 9

| Difference in Correlations | Probabilities Adjustment |
|---|---|
| + 0-2 | 5% increase |
| - 0-2 | 5% decrease |
| + 3-5 | 10% increase |
| - 3-5 | 10% decrease |
| + 6-8 | 15% increase |
| - 6-8 | 15% decrease |
| --- | --- |
| --- | --- |
| --- | --- |

Fig 10

| Probability ID | Event | Time | Quarter | Action | Probability |
|---|---|---|---|---|---|
| 201 | Patriots Vs. Jets | 13:52 | 2nd | Patriots Pass | -115 |
| 202 | Patriots Vs. Jets | 13:52 | 2nd | Patriots Run | -105 |
| 203 | Patriots Vs. Jets | 13:52 | 2nd | Patriots Run Over 3 yards | -125 |
| 204 | Patriots Vs. Jets | 13:52 | 2nd | Patriots Run Under 3 yards | +150 |
| 205 | Patriots Vs. Jets | 13:52 | 2nd | Patriots Pass Over 8 yards | +200 |
| 206 | Patriots Vs. Jets | 13:52 | 2nd | Patriots Pass Under 8 yards | -115 |
| --- | --- | --- | --- | --- | --- |
| --- | --- | --- | --- | --- | --- |
| --- | --- | --- | --- | --- | --- |

Fig 11

| Probability ID | Adjustment |
|---|---|
| 201 | 5% increase |
| 202 | 5% decrease |
| --- | --- |
| --- | --- |
| --- | --- |

Fig 12

| **Probability ID** | **Play Data** |
|---|---|
| 123654 | Pass |
| 123654 | Pass |
| 123654 | Pass |
| 123654 | Run |
| ... | ... |
| 123655 | Run |
| 123655 | Pass |
| 123655 | Pass |
| 123655 | Pass |

Fig 13

| Probability Data | | | Event Data | | | |
| --- | --- | --- | --- | --- | --- | --- |
| Probability ID | Action | Probability | Team | Quarter | Down | To Gain |
| 123654 | Pass | -105 | Falcons | 2nd | 3rd | 10 |
| 123655 | Run | -115 | Falcons | 2nd | 3rd | 10 |
| 123656 | Over 5 Yards Gained | -110 | Falcons | 2nd | 3rd | 10 |
| 123657 | Under 5 Yards Gained | -105 | Falcons | 2nd | 3rd | 10 |
| --- | --- | --- | --- | --- | --- | --- |
| --- | --- | --- | --- | --- | --- | --- |

1700

1904

1906

1902

1900

1920

1922

1924

1926

1928

2152

2154

2150

2302

2304

2306

2300

LIVE EVENT INFORMATION DISPLAY METHOD, SYSTEM, AND APPARATUS

CROSS-REFERENCE TO RELATED APPLICATIONS

This application is a Bypass Continuation of International Patent Application No. PCT/US2023/065568, filed on Apr. 10, 2023, and which claims priority from U.S. Provisional Application No. 63/335,368, filed on Apr. 27, 2022, U.S. Provisional Application No. 63/334,275, filed on Apr. 25, 2022, U.S. Provisional Application No. 63/332,744, filed on Apr. 20, 2022, U.S. Provisional Application No. 63/332,330, filed on Apr. 19, 2022, U.S. Provisional Application No. 63/332,333, filed on Apr. 19, 2022, U.S. Provisional Application No. 63/331,951, filed on Apr. 18, 2022, U.S. Provisional Application No. 63/331,338, filed on Apr. 15, 2022, U.S. Provisional No. 63/331,339, filed on Apr. 15, 2022, and U.S. Provisional Application No. 63/328,858, filed on Apr. 8, 2022, the entire contents of which are incorporated herein by reference.

BACKGROUND

Live sporting event broadcasts are huge with millions of people often tuning in to watch their favorite teams plays. However, following everything going on in a game can be difficult for those who are not as familiar with the sport in question, and even for experts and sports fanatics all the information they may want is not readily available in an easily digestible fashion while they watch the game.

Viewers generally have to rely on what information is shared or displayed by commentators on the game, but even the commentators may not have access to up-to-date live probabilities and statistics as the game goes on. Many viewers may wish to have a greater depth of live, constantly updating information available to them in an easily digestible fashion.

A method, system, and apparatus for generating probabilities, for example for displaying on a video feed, which may be generated or adjusted using machine learning and/or artificial intelligence. One embodiment includes a method for generating and adjusting probabilities, including receiving statistical information of a live event in real time, storing the results of an action in the live event in a historic action database, filtering data in the historic action database related to situational data that matches upcoming action in the live event, performing correlations on similar historical data related to the situational data that matches upcoming action in the live event, determining a difference between correlated data of the similar historical data and the data that matches the upcoming action in the live event, comparing the difference to a recommendations database, and adjusting probabilities based on the recommendations database.

In further embodiments the method, system, and apparatus may use the generated probabilities in order to create and display probability graphics on a display device. The graphics may be generated and/or updated using artificial intelligence or machine learning. Display information may be updated in real-time as changes are made in the game (e.g. a player injury, substitutions, changing weather conditions, etc.). In some embodiments the changes may be detected by a detection system on the field, attached to players or equipment, etc. In an exemplary embodiment the detection system may be one or more microchips that may be embedded in the pads of each player to automatically detect player movements or physiological data. In other embodiments the detection system may be a high powered camera systems may be use that are able to detect, for example, player facial expressions, spin on the ball, speed of players or the ball, etc. In yet other embodiments the detection system may be one or more sensors arranged on or around the field. More than one detection system may be used to supplement detection accuracy or speed, or the breadth of data collected.

BRIEF DESCRIPTION OF THE FIGURES

Advantages of embodiments of the present invention will be apparent from the following detailed description of the exemplary embodiments. The following detailed description should be considered in conjunction with the accompanying figures in which:

FIG. 3 illustrates a live event database, according to an embodiment.

FIG. 7 illustrates a historic action database, according to an embodiment.

FIG. 8 illustrates a historic sensor database, according to an embodiment.

FIG. 9 illustrates a recommendations database, according to an embodiment.

FIG. 10 illustrates a probabilities database, according to an embodiment.

FIG. 11 illustrates an adjustment database, according to an embodiment.

FIG. 12 illustrates an adjustment database, according to another embodiment.

FIG. 13 illustrates a recommendations database, according to another embodiment.

DETAILED DESCRIPTION

Figure 1:
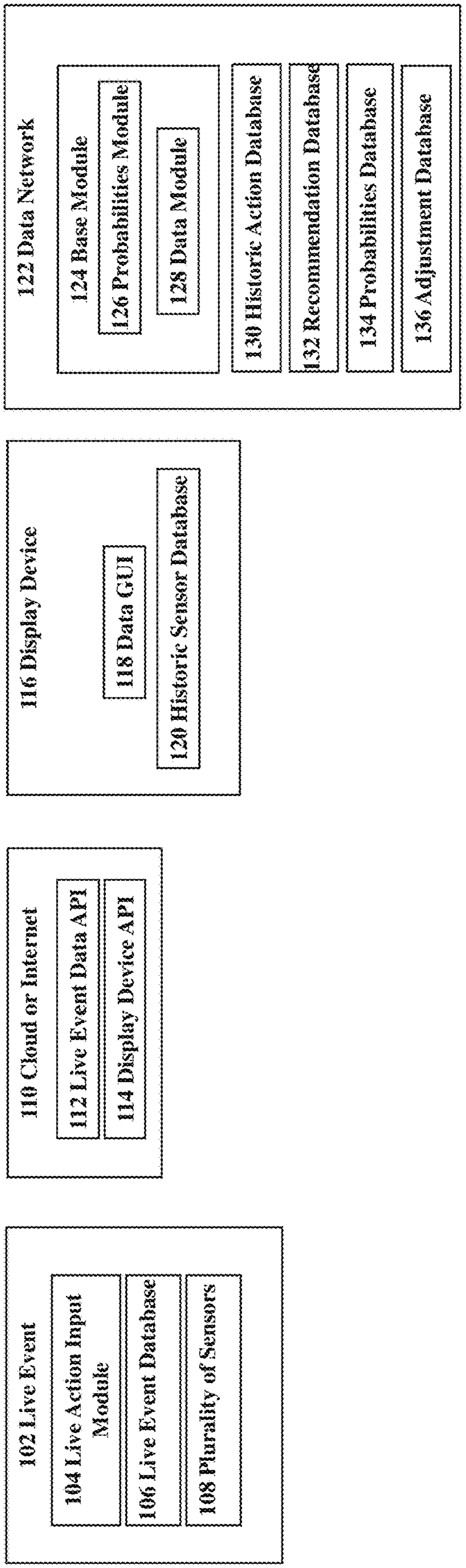
FIG. 1 illustrates a system for artificial intelligence based live game probability calculation, according to an embodiment.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sport is playing at a given real time sports, probabilities could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Augmented reality means a technology that superimposes a computer-generated image on a user's view of the real world, thus providing a composite view. In an example, a real time view of the game can be seen and a "guess" which is a computer-generated data point is placed above the player that is guessed on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

As used herein Robotic Process Automation (RPA) may be the use of software with some aspects of AI or machine learning capabilities to handle high-volume, repeatable tasks that previously required humans to perform. An example of this may be software for a "web crawler" that can eliminate hundreds of hours of searching each time the same searches need to be conducted on specific web searches. Robotic process automation may be integrated with one or more of the embodiments.

As used herein a database may include, but is not limited to, publicly available data sets such as dictionaries, databases behind a paywall, internal databases of, for example, non-disclosure agreements, invention disclosures, competitive analysis, statistical information of, for example, a sports game, etc. It may be understood that some databases may include an Application Specific Interface (API) which may enable a program to extract data from a search.

As used herein, a scheme may refer to any game plan, play, or strategy used before, during, or after a sporting game or event.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for artificial intelligence based live game probability calculation. This system may include a live event 102, for example a sporting event such as a football game, basketball game, baseball game, hockey game, tennis match, golf tournament, etc. The live event 102 may include some number of actions or plays, upon which probabilities can be calculated.

Further, a live action input module 104 may receive data about each individual action in a game or match and store the data in a live event database 106. In some embodiments, an action may be a specific play or specific event in a sporting event. In some embodiments, an action may be a throw, shot, pass, swing, kick, hit, performed by a participant in a sporting event. In some embodiments, an action may be a strategic decision or scheme made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem length, and the like. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, and the like. The live event database 106 may be provided, which may store data collected by the live event module 104 such as the results of the action that has just occurred as well as the situational data for the next upcoming action.

In some embodiments the system for artificial intelligence based live game probability calculation may include a detection system such as a plurality of sensors 108. The sensors may include, for example, motion sensors, temperature sensors, humidity sensors, cameras such as an RGB-D Camera which is a digital camera providing color (RGB) and depth information for every pixel in an image, microphones, radiofrequency receiver, a thermal imager, a radar device, a lidar device, an ultrasound device, a speaker, wearable devices etc. Also, the plurality of sensors 108 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that provides statistical information through real-time X, Y positioning of players and X, Y, Z positioning of the ball. In some embodiments, the sensor data is collected from the live event 102 and sent to a server or a cloud 110 where it is stored in a historical action database 130. In some embodiments, the sensor data may be collected from a third party source and stored on the server or cloud 110. Further, the availability of sensor data may be displayed to a user and/or any sensor data itself may be displayed to a user. Further, the availability or use of sensor data may be activated or deactivated by a user.

A cloud 110 or communication network may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, and other communication techniques, as desired. The communication network may allow ubiquitous access to shared pools of configurable system resources and higher-level services that can be rapidly provisioned with minimal management effort, often over internet and relies on sharing of resources to achieve coherence and economies of scale, like a public utility, while third-party clouds enable organizations to focus on their core businesses instead of expending resources on computer infrastructure and maintenance. A live event data API 112 delivers data from the live event 102 to a data network 122. A display device API 114 delivers data between the data network 122 and a display device 116.

The display device 116 may be a computing device, laptop, smartphone, tablet, computer, smart speaker, television screen, teleprompter, or I/O device. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT®, Nintendo Wiimote® for the WIT, Nintendo® WII U GAMEPAD®, or Apple IPHONE®. Some devices allow gesture recognition inputs through combining some of the inputs and outputs. Some devices may provide for facial recognition which may be utilized as an input for different purposes including authentication and other commands. Some devices may provide for voice recognition and inputs, including, e.g., Microsoft KINECT®, SIRI® for IPHONE by Apple, Google Now or Google Voice Search, and the like.

Additional devices may have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE® or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices. In further embodiments, an I/O device may be a bridge between the system bus and an external communication bus, e.g. a USB bus, a SCSI bus, a FireWire bus, an Ethernet bus, a Gigabit Ethernet bus, a Fibre Channel bus, or a Thunderbolt bus. The display device 116 can leverage the sensors in for purposes such as automatic content recognition, augmented reality or the synchronization of screens between the user device interface and other displays. The display device 116 may display the probabilities for the next action of the live game 102. It may also be appreciated that the display device 116 could be part of a live video display, live television display or any other live video feed of the live game 102 on which probabilities are being provided. In some embodiments there may be a data GUI 118, or guided user interface or graphical user interface, which may display the data options and probabilities for various actions in the live event 102. The interface(s) may either accept inputs from users or provide outputs to the users or may perform both the actions. In one case, a user can interact with the interface(s) using one or more user-interactive objects and devices. The user-interactive objects and devices may include user input buttons, switches, knobs, levers, keys, trackballs, touchpads, cameras, microphones, motion sensors, heat sensors, inertial sensors, touch sensors, virtual reality, augmented reality, eye tracking, or a combination of the above. Further, the interface(s) may either be implemented as a command line interface (CLI), a graphical user interface, a voice interface, or a web-based user-interface. The data network 122 may provide an artificial intelligence based software module that compares data from the live event to data in the historic action database 130 in order to calculate probability of the next action in the live game 102. The data network 122 may be located on the server or cloud 110 which may perform real time analysis on the type of play and the result of a play or action. The server, or cloud 110, may also be synchronized with game situational data, such as the time of the game, the score, location on the field, weather conditions, and the like, which may affect the choice of play utilized. For example, in other exemplary embodiments, the server may not receive data gathered from sensors and may, instead, receive data from an alternative data feed, such as Sports Radar. Data may be received from a remote terminal or mobile device that may be located at the live event 102. The data related to the live event 102 may be entered into the remote terminal or mobile device by one or more administrators of the live game probability calculation system, employee, technician, or other third-party persons. For example, a person may be located at the live event 102 and may provide the position of the players on the field, such as the offensive formation in an American football game, through an input into a remote terminal or mobile device. This human collected data may be used independently, or in conjunction with sensor data, in the generation of probabilities. This data may be provided following the completion of any play and the data from this feed may be compared with a variety of team data and league data based on a variety of elements, including down, possession, score, time, team, and so forth, as described in various exemplary embodiments herein. The system for artificial intelligence based live game probability calculation may further include a base module 124 which receives the live event database 106 from the live event module 104, which contains historical and situational data on the live event 102 currently occurring. The base module 124 stores the historical data in the historic action database 130 and sends the situational data to a probabilities module 126 and initiates the probabilities module 126. The probabilities module 126 uses the situational data from the live event 102 to filter the historic action database 130 on previous actions with some the same situational data and performs correlations on the similar actions in order to determine the difference in the correlations and compare the difference in correlations to the recommendation database 132 in order to adjust the probabilities within the probabilities database 134 accordingly. A data module 128 compares the probabilities database 134 to the adjustment database 136 in order to determine if there is a match in the probabilities IDs. Then, if there is a match, then the probabilities are adjusted accordingly, by the data module 128. A historic action database 130 stores all the historic actions of an event. A recommendation database 132 is used to determine the appropriate adjustment in the probabilities by using the difference in the correlated data from the data module 126. The probabilities database 134 contains the current probabilities. An adjustment database stores the probabilities ID and the appropriate adjustment, for example increase by 5% or decrease by 5%. Any adjusted probabilities can then be displayed via the display device 116, or interface, on a live video feed, such as on a television feed, or any other video live stream. Further, adjusted probabilities may be shown in real time, for example showing a 66% chance of a running play and a 34% chance of a passing play in a football game when the quarterback is positioned under the center and changing to a 75% chance of a passing play and 25% chance of a running play when the quarterback then moves back into a shotgun formation.

Figure 2:
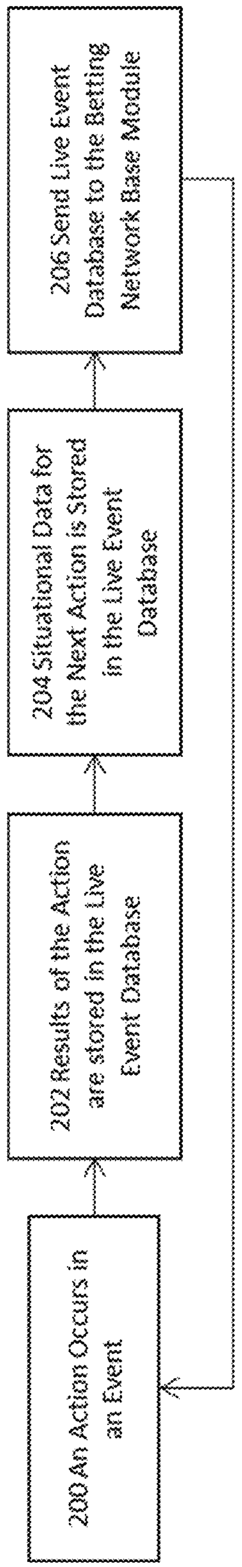
FIG. 2 illustrates a live event module, according to an embodiment.

FIG. 2 provides an illustration of the live action input module 104. The process begins with an action, for example a play, that occurs in an event, such as a sporting event, at step 200. The live action input module 104 then stores the results of the action in the live event database 106, at step 202. The live event module 104 also stores situational data in the live event database 106 which is information for the upcoming action in an event, at step 204. The live action input module 104 then sends the live event database 106 to the data network 122, base module 124, and the process returns to step 200, at step 206.

FIG. 3 provides an illustration of the live event database 106 which contains information on the live event 102, such as results of the last action and information for the upcoming action. The live event database 106 may contain result data such as the action ID, offensive team, offensive players, quarter or time period of the event, down, distance and result of the action such as a pass. In some embodiments, the result data may contain statistical information for offensive, defensive teams, or special teams, players, or coaches. The live event database 106 may also contain situational data or information for the upcoming action in the live event 102. The situational data may include the action ID, offensive team, offensive players, quarter or time period of the event, down and distance. In some embodiments, the live event database 106 may contain information regarding the defensive team or players, individual coaches, location of the event, temperature, levels of precipitation, type of precipitation, time of the event, referees or officials of the event, color of the uniforms for each team, at step 300.

Figure 4:
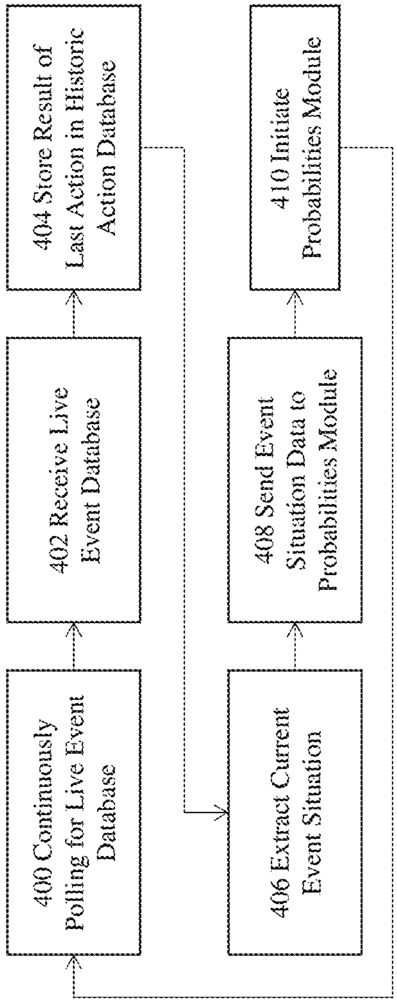
FIG. 4 illustrates a base module, according to an embodiment.

FIG. 4 provides an illustration of the base module 124. The process begins with the base module 124 continuously polling for the live event database 106 from the live action input module 104, at step 400. The base module 124 receives the live event database 106, at step 402. The base module 124 stores the results data, or the results of the last action, in the historic action database 130 which contains historical data of all previous actions, at step 404. The situational data from the live event database 106 is extracted, at step 406. The extracted situational data from the live event database 106 is sent to the probability module 126, at step 408. The probability module 126 is initiated, and the process returns to continuously polling for the live event database 106, at step 410.

Figure 5:
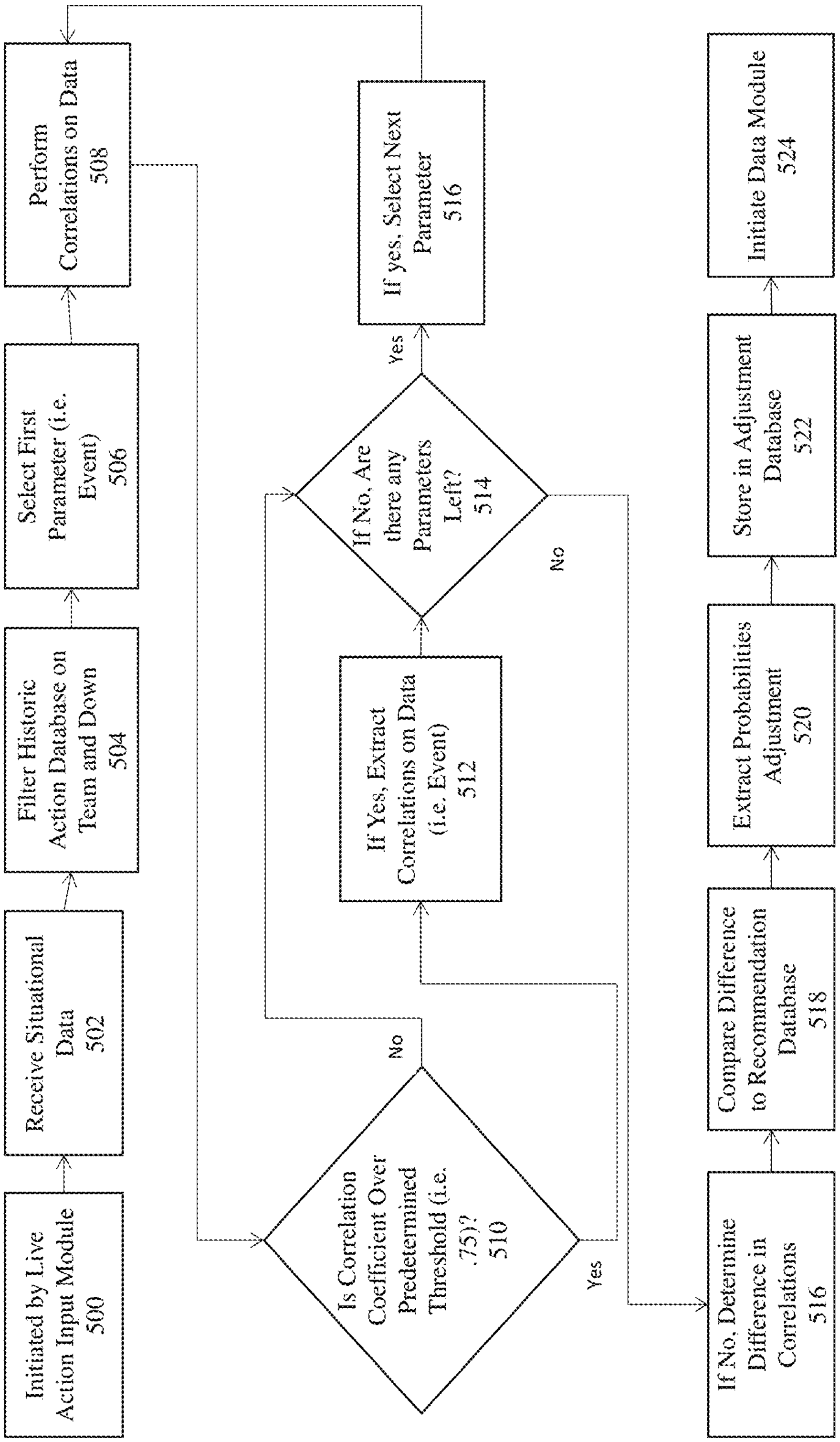
FIG. 5 provides an illustration of a probability module, according to an embodiment.

FIG. 5 provides an illustration of the probability module 126. The process begins with the probability module 126 being initiated by the base module 124, at step 500. The probability module 126 receives the situational data, or information about the upcoming action or action in an event, from the base module 124, at step 502. The probability module 126 filters the historic action database 130 on the team and down from the situational data, at step 504. The first parameter of the historic action database 130 is selected, for example the event, at step 506. Then the probability module 126 performs correlations on the data. For example, the historical action database 130 is filtered on the team, the players, the quarter, the down and the distance to be gained. The first parameter is selected which in this example is the event, which may either be a pass, or a run and the historical action database 130 is filtered on the event being a pass. Then, correlations are performed on the rest of the parameters, which are yards gained, temperature, decibel level, etc. In FIG. 15B, the graph shows the correlated data for the historical data involving the Patriots in the second quarter on second down with five yards to go and the action being a pass, which has a correlation coefficient of 0.81. The correlations are also performed with the same filters and the next event which is the action being a run which is also shown in FIG. 15B and has a correlation coefficient of 0.79, at step 508. It is determined if the correlation coefficient is above a predetermined threshold, for example 0.75, in order to determine if the data is highly correlated and deemed a relevant correlation, at step 510. If the correlation is deemed highly relevant, then the correlation coefficient is extracted from the date. For example, the two correlation coefficients of 0.81 for a pass and 0.79 for a run are both extracted, at step 512. If it is determined that the correlations are not highly relevant, then then it is determined if there are any parameters remaining. Also, if the correlations were determined to be highly relevant therefor extracted It is also determined if there are any parameters remaining to perform correlations on, at step 514. If there are additional parameters to have correlations performed then the probability module 126 selects the next parameter in the historic action database 130 and returns to step 508, at step 516. Once there are no more remaining parameters to perform correlations on, the probability module 126 then determines the difference between each of the extracted correlations. For example, the correlation coefficient for a pass is 0.81 and the correlation coefficient for a run is 0.79. The difference between the two correlation coefficients (0.81−0.79) is 0.02. In some embodiments, the difference may be calculated by using subtraction on the two correlation coefficients. In some embodiments, the two correlation coefficients may be compared by determining the statistical significance. The statistical significance, in an embodiment, may be determined by, for example, using the following formula: Zobserved=(z1−z2)/(square root of [(1/N1−3)+(1/N2−3)], where z1 is the correlation coefficient of the first dataset, z2 is the correlation coefficient of the second dataset, N1 is the sample size of the first dataset, and N2 is the sample size of the second dataset, and the resulting Zobserved may be used instead of the difference of the correlation coefficients in the recommendation database 132 to compare the two correlation coefficient based on statistical significance as opposed to the difference of the two correlation coefficients, at step 516. The difference between the two correlation coefficients, 0.02, is then compared to the recommendation database 132. The recommendation database 132 contains various ranges of differences in correlations as well as the corresponding probability adjustment for those ranges. For example, the 0.02 difference of the two correlation coefficients falls into the range +0-2 difference in correlations which according to the recommendation database 132 may have a probability adjustment of 5% increase, at step 518. The probability module 126 then extracts the probability adjustment from the recommendation database 132, at step 520. The extracted probability adjustment is stored in the adjustment database 136, at step 522. Then probability module 126 initiates the data module 128, at step 524.

In other embodiments, it may be appreciated that the previous formula may be varied depending on a variety of reasons, for example adjusting probability based on further factors, adjusting probability based on changing conditions or additional variables. Additionally, in other exemplary embodiments, one or more alternative equations may be utilized in the probability module 126. One such equation could be Zobserved=(z1−z2)/(square root of [(1/N1−3)+(1/N2−3)], where z1 is the correlation coefficient of the first dataset, z2 is the correlation coefficient of the second dataset, N1 is the sample size of the first dataset, and N2 is the sample size of the second dataset, and the resulting Zobserved to compare the two correlation coefficient based on statistical significance as opposed to the difference of the two correlation coefficients. Another equation used may be $Z=b_1-b_2/S_{b1-b2}$ to compare the slopes of the datasets or may introduce any of a variety of additional variables, such as $b_1$ is the slope of the first dataset, $b_2$ is the slope for the second dataset, $S_{b1}$ is the standard error for the slope of the first dataset and $S_{b2}$ is the standard error for the slope of the second dataset. The results of calculations made by such equations may then be compared to the recommendation database 132 and the probability module 126 may then extract a probability adjustment from the recommendation database 132. The extracted probability adjustment is then stored in the adjustment database 136 and the data module 128 is initiated by the probability module 126, as in the above.

In other embodiments, the probability module 126 may adjust probabilities based on one or more current states of the live event 102. In one state, the probability module 126 may use data from the historic action database 130 to create probabilities for one or more potential outcomes of the current state of the live event 102. For example, the data network 122 may determine there is a 75% chance that Aaron Judge gets a hit in his current at-bat, based on his batting average in previous at-bats against the current pitcher. In a second state, the probability module 126 may utilize data from the live event data API 112 to adjust the probability. For example, spin rate of pitches may be tracked in real-time. The average spin rate on four-seam fastballs thrown by Clayton Kershaw in the current game may be 2732. That may be 10% higher than his average spin rate has been on that pitch this season. This may be used to adjust the probability of Aaron Judge getting a hit in the current at-bat from the 75% that would be used based on the two players' historical interactions to 80%.

It can be noted that the probability module 126 can be made available for access, reconfiguration, modification, or control for customers or used for managed service user interface service, managed service risk management services, managed service compliance service, managed service pricing and trading service, managed service and technology platform, managed service and marketing support services, payment processing services, business applications, engaging promotions, business applications, state based integration, game configurator, "fantasy sports connector", software as a service, synchronization of screens, automatic content recognition (ACR), joining social media, Augmented reality, digital gaming, or "eSports".

Functioning of the data module 128 will now be explained with reference to FIG. 6. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
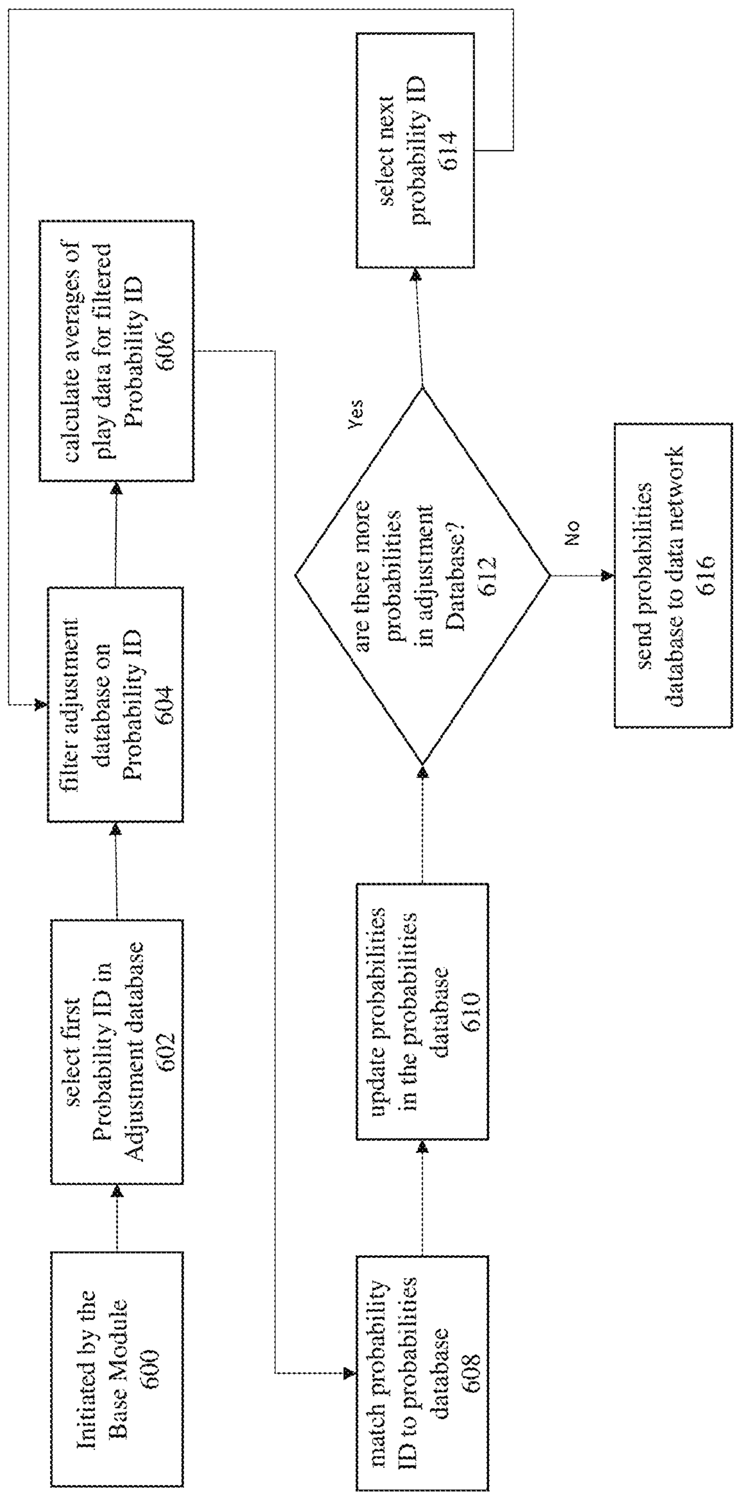
FIG. 6 illustrates a data module, according to an embodiment.

FIG. 6 provides an illustration of the data module 128. The process begins with the data module 128 being initiated by the base module 124, at step 600. The data module 128 selects the first probability ID in the adjustment database 136, which stores the probability ID as well as the most reoccurring action from the filtered data from the process described in FIG. 5, at step 602. Then the data module 128 filters the adjustment database 136 on the probability ID, which leaves all the most reoccurring action or play result data that were calculated for the specific action. Play data can be any data that indicates anything about the live game, such as, but not limited to audio or visual data that indicates "actions", "sides", "event" data, "total" data, "listed pitchers", specific players, whistles, fouls, touchdowns, goals, yardage, player error, etc., at step 604. The data module 128 then calculates the averages of all the most reoccurring action or play results, such as a pass or a run, for the filtered probability ID. The average of the play results may be used as probabilities of the action occurring which may be used to update or improve the current probability that are stored in the current probabilities database 134, at step 606. Then the data module 128 matches the probability ID from the adjustment database 136 to the probability ID stored in the current probabilities database 134 in order to update the corresponding probability, at step 608. The adjustment module 136 then updates the current probabilities database 134 by using the probabilities calculated in step 606. For example, probability ID 123654, which is a probability for a pass to occur on the next play which is 3rd and ten to go, otherwise known as a 3rd and long, is originally calculated with probability of −105. The averages calculated from the adjustment database show that out of four highly correlated instances three plays were passing plays and only one was a run play. So, the probability of the play being a pass would be 75%, or $^{33}/_{100}$ which would translate to −300 and the probability for probability ID 123654 in the current probabilities database 134 would be updated to −300, at step 610. It is then determined by the adjustment module 136 if there are any remaining probability IDs in the adjustment database 136, at step 612. If it is determined there are more remaining probability IDs then the next probability ID is selected and the process returns to 604, at step 614. If there is no more remaining probability IDs from the adjustment database 136 then the process returns to the base module 110, at step 616.

FIG. 7 provides an illustration for the historic action database 130, which is created via the base module 124 storing the results from the live event database 106. The historic action database 130 contains situational data such as the action ID, the team, the players, the quarter, the down, and the distance. The historic action database 130 also contains parameters such as the event, yards gained, temperature, decibel level, and players. It should be noted that the historic action database 130, in an embodiment, is used for the purpose of a working example for football, but can also be implemented for any other sport or event, as desired. The historic action database 130 may contain situational data and parameters for various events or sporting events such as football, basketball, baseball, hockey, soccer, rugby, golf, tennis, etc. The situational data is information about actions such as the statistical information for teams or individuals competing in an event, the time period of the event, and information leading up to the upcoming action, for example, in the current lead or deficit for a team or player, the location of a certain player or players on the event field, court, or pitch, etc. In some embodiments, the situational data may be information related to sensor data related to individual players, teams, or sensor data retrieve from wearable devices or equipment such as balls, protective equipment, clubs, bats, etc. The parameters would be the information containing the results of the situational data which would be the statistical data that resulted from the action related to the situational data, in FIG. 7.

Functioning of the historic sensor database 120 will now be explained with reference to FIG. 8. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 8 illustrates the historic sensor database 120 which contains all the sensor data collected from participants of previous live events. The database contains event data, which is information about the event at that specific period of time in the event such as which team the sensor data was collected for, the player or participant the sensor data was collected for, what position the player plays or is aligned for the specific play, the quarter or period of time in the event the data was collected, the down and distance to go and the resulting play, for example a pass or run. The database also contains the sensor data collected during the play such as the speed of the payer, the distanced the player traveled in total, the separation and the yards after catch. The database as currently shown is filtered for the event data and the participant in order to determine if there are any correlations between the sensor data collected and the outcome of the play to determine if the probabilities should be adjusted in the probabilities database 134. In some embodiments, the sensor data collected may represent player's or participant's position on the field of play during an event.

FIG. 9 provides an illustration for the recommendations database 132 which is used by the probability module 126 to determine how the probabilities should be adjusted depending on the difference between the correlation coefficients of the correlated data points. The recommendations database 132 may contain the difference in correlations and the probability adjustment. For example, in FIG. 14B there is a correlation coefficient for a Patriots $2^{nd}$ down pass of 0.81 and a correlation coefficient for a Patriots $2^{nd}$ run of 0.79, the difference between the two would be +0.02 when compared to the recommendation database 132 the probability adjustment would be a 5% increase for a Patriots pass or otherwise identified as probability 201 in the adjustment database 136. In some embodiments, the difference in correlations may be the statistical significance of comparing the two correlation coefficients in order to determine how the probabilities should be adjusted.

FIG. 10 provides an illustration for the probability database 134 which contains the potential probability of actions in the event and is updated via the probabilities module 126 and the data module 128 depending on the resulting correlation coefficients. The probability database 134 may contain the probability ID, the event, the time, the quarter, and the probability. It should be noted that the probability database 134 is currently constructed to provide a working example using football as the event, but the probability database 134 may be constructed based on a sport by sport basis.

FIG. 11 provides an illustration for the adjustment database 136 which may be used to adjust the probabilities of the probabilities database 134, if it is determined that a probability should be adjusted. The adjustment database 136 contains the probability ID, which is used to match the with the probability database 134 to adjust the correct probability.

Functioning of the adjustment database 136 will now be explained with reference to FIG. 12. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

FIG. 12 illustrates another exemplary embodiment of the adjustment database 136 which may stores the most reoccurring play data extracted from the probabilities module 126 along with the probability ID in order to determine the probability of the upcoming play by determining the average occurrence of the play happening with similar event data and highly correlated sensor data through the process described in the data module 128. The database may contain the probabilities ID and the play data, such as a pass or a run.

Functioning of another exemplary embodiment of the probabilities database 134 will now be explained with reference to FIG. 13. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The probabilities database 134 may contains a list of all current probabilities available to the users of the server. The database may contain probability data such as the probability ID, a description of action, and the probability. The database may contain event data related to the probability such as the team, the quarter or time period for the upcoming play, the down, and the distance to gain.

Figure 14B:
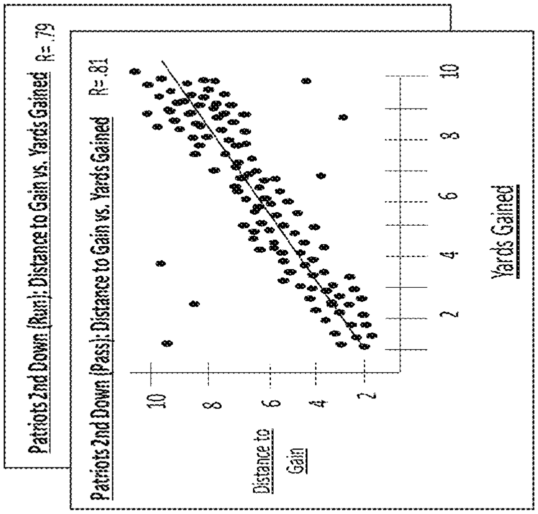
FIG. 14B illustrates an example of a probabilities module, according to an embodiment.
Figure 14A:
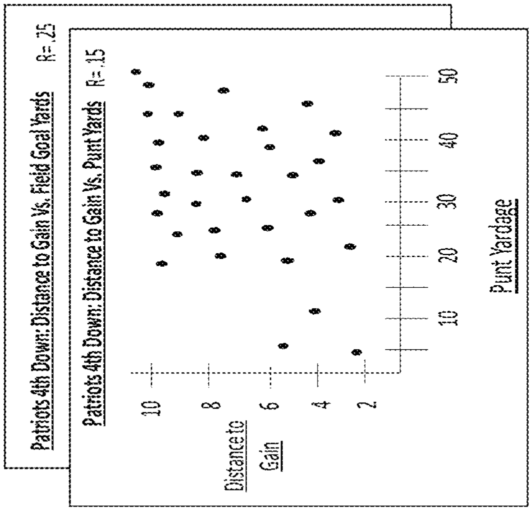
FIG. 14A illustrates an example of a probabilities module, according to an embodiment.

FIG. 14A provides an illustration of an example of the probability module 126 and the resulting correlations. In FIG. 14A, the data is filtered by the team, down and quarter and finding the various correlations with the team, down and quarter and the various parameters such as the yards to gain, punt yardage, field goal yardage, etc. An example of non-correlated parameters with the team, down, and quarter and the yards to gain and punt yardage with a 15% (which is below the 75% threshold), therefore there is no correlation and the next parameters should be correlated, unless there are no more parameters remaining.

FIG. 14B provides an illustration of an example of the probability module 126 and the resulting correlations. In FIG. 14B, the data is filtered by the team, down and quarter and finding the various correlations with the team, down and quarter and the various parameters such as the event, yards to gain, yards gained, etc. An example of correlated parameters is with the event being a pass and the team, down, and quarter with an 81%, therefore there is a correlation (since it is above the 75% threshold) and the correlation coefficient needs to be extracted and compared with the other extracted correlation coefficient which in this example is the event data where the event is a run, which is correlated at 79%. The difference of the two correlations is compared to the recommendations database in order to determine if there is a need to adjust the probabilities. In this example, there is a 0.02 difference between the event being a pass and the event being a run, which means on second down in the second quarter the New England Patriots are slightly more likely to throw a pass than to run the ball and the probabilities are adjusted 5% decrease in order to match the correlated data. Conversely, if the correlated data of run, 0.79 is compared to the correlated data of a pass, 0.81, then the difference would be −0.02 and the probabilities would be adjusted by 5% increase, at step 1104.

Figure 15A:
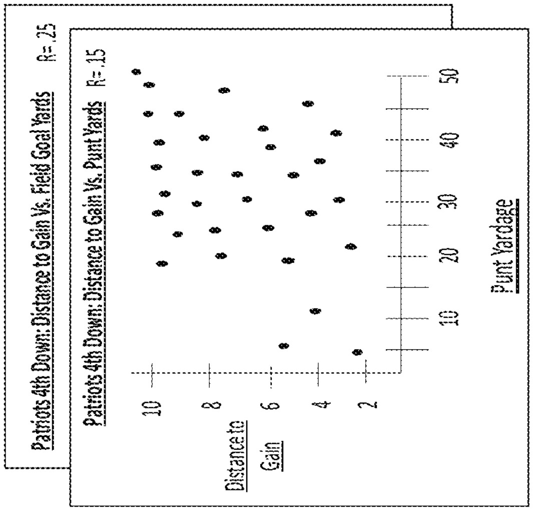
FIG. 15A illustrates another example of a probabilities module, according to an embodiment.
Figure 15B:
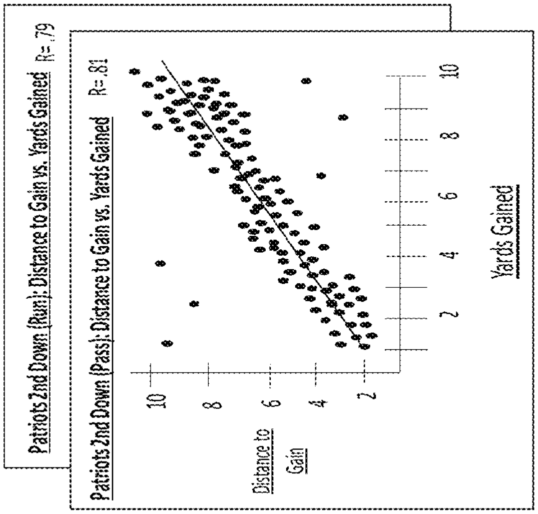
FIG. 15B illustrates another example of a probabilities module, according to an embodiment.

FIG. 15A provides an illustration for another example of the probability module and the resulting correlations. In FIG. 15A, the data that is filtered by the team, down and quarter and finding the various correlations with the team, down and quarter and the various parameters such as the decibel level in the stadium, punt yardage, field goal yardage, etc. An example of non-correlated parameters with the team, down, and quarter and the decibel level in the stadium and punt yardage with a 17% (which is below the 75% threshold), therefore there is no correlation and the next parameters should be correlated, unless there are no more parameters remaining.

FIG. 15B provides an illustration for another example of the probability module and the resulting correlations. In FIG. 15B, the data that is filtered by the team, down and quarter and finding the various correlations with the team, down and quarter and the various parameters such as the event, temperature, yards gained, etc. An example of correlated parameters is with the event being a run and the team, down, and quarter with an 92%, therefore there is a correlation (since it is above the 75% threshold) and the correlation coefficient needs to be extracted and compared with the other extracted correlation coefficient which in this example is the event data where the event is a pass, which is correlated at 84%. The difference of the two correlations are compared to the recommendations database in order to determine if there is a need to adjust the probabilities. In this example, there is a 0.08 difference between the event being a run and the event being a pass, which means on first down in the first quarter the New England Patriots are more likely to throw a run than to pass the ball and the probabilities are adjusted 15% decrease in order to match the correlated data. Conversely, if the correlated data of run, 0.84 is compared to the correlated data of a pass, 0.92, then the difference would be −0.08 and the probabilities would be adjusted by 15% increase.

In one or more exemplary embodiments AI or ML may be used to generate probabilities based on a plurality of factors.

Figure 16:
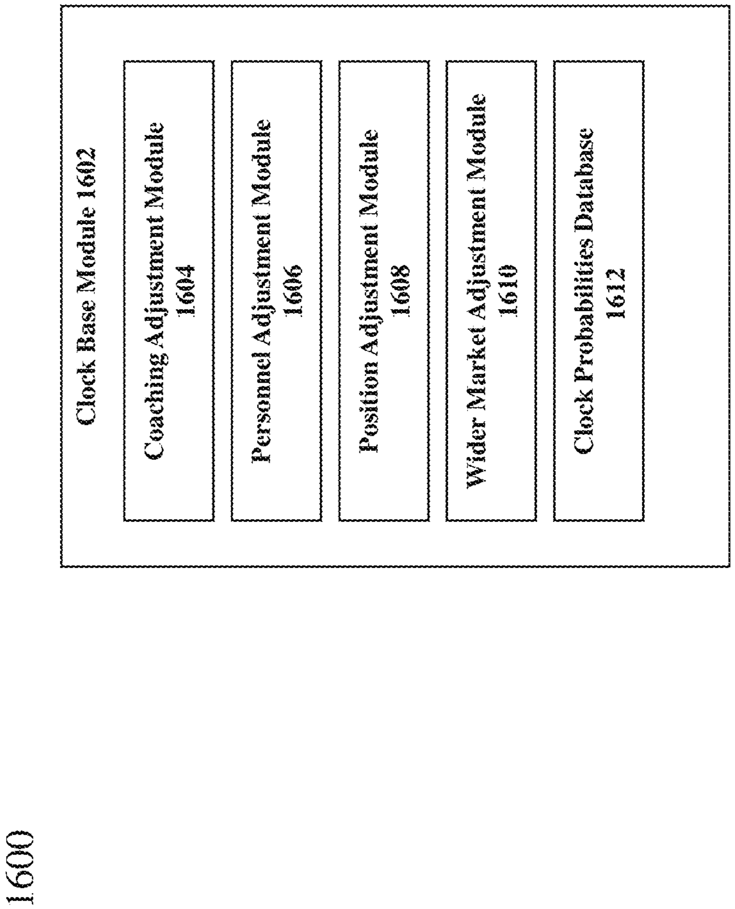
FIG. 16 shows an exemplary system for generating or optimizing probabilities based on a clock.

Referring to exemplary FIG. 16, a first exemplary system for generating or optimizing probabilities based on a clock 1600 may be shown. The system for generating probabilities based on the clock 1600 may include a clock base module 1602. The clock base module 1602 may control one or more other clock modules in order to generate or optimize probabilities being offered on one or more prediction markets on one or more plays in a sports game, for example on plays in an American football game or a baseball game. The clock base module 1602 may be controlled or connected to a larger system base module, for example base module 124 described above.

In an exemplary embodiment the clock base module 1602 may control the one or more other clock modules to identify factors in a sports game related to the clock that may impact one or more probabilities of the one or more plays. The probabilities may be adjusted at any point between when the prediction market opens and closes or may be adjusted as pre-market or post-market probabilities.

It may be understood that probabilities offered may be changed at any point, and may change dynamically, in response to changes in circumstances before, during, or after the one or more plays. In some embodiments specific sub-modules may be triggered in response to specific events, for example a coaching adjustment module 1604 may be triggered at the completion of a play, as that may be the time when the context of the game including time on the clock, score, field position, etc are all known factors for determining probability for a next play. In another embodiment the occurrence of substitutions may trigger a personnel adjustment module 1606. In yet another embodiment a position adjustment module 1608 may be triggered when one or more players line up at the beginning of the next play. One or more of these, or other, circumstances may also trigger a wider market adjustment module 1610, which may determine the impact a next play specific probability may have on markets outside the next play, for example on future plays, overall game markets, and/or plays in other games. Finally, the probabilities determined may be stored in a clock probabilities database 1612. It may be understood that the modules may be called in any order and/or that multiple modules may be run simultaneously.

Now explaining the modules in more detail, in an exemplary embodiment the coaching adjustment module 1604 may use AI to predict how a coach or coaching staff tends to drive probabilities for different outcomes in one or more prediction markets. For example, an initial or general probability may be determined, such as an average NFL team passes on 60% of offensive plays. Additional play context may then be used to further tailor the probability, such as probability adjustments associated with the positions on the field, with similar score and time remaining, etc. As an example, it may be determined that 52% of $1^{st}$ and 10 plays are passes, but 68% of $2^{nd}$ and 10 plays are passes.

The coaching adjustment module 1604 may then determine additional adjustments based on one or more coaches tendencies, for example the coaching adjustment module 1604 may determine that the Cleveland browns only passed 40% of their $1^{st}$ and 10 plays between 2018 and 2021, while the Kansas City Chiefs passed on 61% of $1^{st}$ and 10 plays during the same period. The coaching adjustment module 1604 may then take these trends into account in order to adjust the probability of the current play.

In some embodiments the time remaining on the game clock, or the time remaining relative to a specific portion of a game (e.g. time until end of quarter) may impact the tendency of the coach or team and therefore affect the related probabilities. For example, a team may implement a "four-minute offense" strategy if, for example, they are leading a game and there are give minutes left in the fourth quarter. The "four-minute offense" strategy may allow the team to burn remaining time off the clock by avoiding incomplete passes and going out of bounds while still achieving first downs. Therefore, it may be determined that teams leading with less than five minutes in a fourth quarter may pass significantly less than in other situations, for example less than 20% of the time. In other situations, other specific strategies or schemes may tend to skew probabilities, other strategies may include, for example, "two-minute offense".

In some embodiments specific coaching staffs may have different tendencies in approaching specific aspects of the game, for example a first coach may be twice as likely to pass while leading with less than five minutes left in the fourth quarter than the average coach because his offensive scheme relies on a lot of bubble screens in that situation.

In an exemplary embodiment machine learning may be applied to historical play data and may identify coaching patterns and tendencies to apply to probabilities in given situations. For example, while coach A may be 10% more likely than average to run on a play when trailing close and late, that coach may be 25% more likely to run when they have two or more timeouts. It may be understood that in many situations each coaching staff may have multiple members, for example the head coach, offensive coordinator, defensive coordinator, etc. Some head coaches may insist on making most of the decisions and play calls themselves, while other head coaches may delegate play-calling to their coordinators and coaches. In an embodiment AI and ML may identify which coaches are the decision-makers whose tendencies should be tracked by comparing trends across different staff compositions. The probabilities for each play event may then be calculated and stored, for example in the clock probabilities database 1612.

Now explaining the personnel adjustment module 1606 in more detail. The personnel adjustment module 1606 may extract initial probabilities from, for example, the clock probabilities database 1612. The personnel adjustment module 1606 may use AI or ML to predict how the personnel on the field, and the attributes of those personnel, drive the probabilities of a play. For example, different defensive backs may have different abilities to match up in coverage with different types of receivers. The better the defensive backs on the field, the lower the chances of a successful passing play. This may, for example, increase the likelihood that a coach or quarterback changes the play to a run. Likewise, the formation or a number of a specific position adjust the probabilities of certain actions, for example a five defensive back formation vs. a six defensive back formation. The strengths and weaknesses of each personnel decision may further vary based on the context of the game, such as field position, score, and the number of timeouts remaining. For example, a defense with six of the best defensive backs in the league may deploy in dime defense. Normally this may be a good defense to run against, but a team trailing late in the game with no timeouts remaining may still have to pass to avoid being tackled in bounds and having the clock run out.

The combination of coaching tendencies, personnel, and time on the clock may also be identified. The identity of the players in a specific position, for example the identity of the defensive backs in a particular formation, may have an additional impact on the probabilities of various outcomes. For example, a cornerback shorter than 5'10" will have less success covering receivers over 6'5", leading to an identifiable matchup advantage. The context of the game, specifically coaching tendencies, position on the field, and time remaining, may significantly impact the likelihood of this type of matchup being exploited by the offense. A coach may be more likely to motion pre-snap to get the matchup between the tall receiver and the short cornerback. Similarly, certain quarterbacks may be more likely than others to check out of a run play to exploit the height advantage of the receiver. The updated probabilities may then be sent to a database, for example the clock probabilities database 1612.

Now explaining the position adjustment module 1608 in more detail. The position adjustment module 1608 may extract initial probabilities from, for example, the clock probabilities database 1612.

The position adjustment module 1608 may utilize the positioning of personnel on the field, and attributes of that personnel, in order to adjust the probabilities of one or more plays in a prediction market. For example, in an exemplary football game the number of players in the box may significantly impact the probabilities of certain outcomes. The position adjustment module 1608 may use one or more sensors to detect the number of players in the box, and who those players are. For example, sensors may identify there are eight defenders in the box and identify that the eighth defender is the strong safety creeping toward the line of scrimmage. The sensors may also determine there is a strong safety who may be a player who is an excellent pass rusher. Their ability as a pass rusher may be determined by their efficiency percentage in creating pressure on the quarterback when they blitz. So, the safety's presence in the box and pressure efficiency may make them a threat to a passing play, even against eight men in the box. Machine learning may determine the checks a given quarterback is likely to make at the line of scrimmage against specific defenses. A quarterback may be more likely to check to a slant pass to the slot wide receiver into the area that is about to be vacated by the blitzing strong safety, and the system may increase the probabilities of a pass when detecting the safety position. It may be understood that AI or ML may be used to make the probability or odds adjustments. The adjusted probabilities may be stored in, for example, the clock probabilities database 1612.

In some embodiments real-time assessment of player position may be obtained by, for example, applying object recognition to video or sensors attached to the players. The real-time information may allow for automatic determination of one or more player's positions and may allow for the calculation of the above probability adjustments. For example, in an exemplary football game sensors in the shoulder pads of the safety and receivers could tell the system how close the safety is to the line of scrimmage and that the receiver is lined up behind the line of scrimmage, making a blitz and backward pass more likely.

Now explaining the wider market adjustment module 1610 in more detail. The market adjustment module 1610 may extract initial probabilities from, for example, the clock probabilities database 1612. The initial probabilities extracted may be from a different live game or prediction market than the currently plays being utilized by the other modules.

The market adjustment module 1610 may determine how the probabilities adjustments made by other modules, for example the coaching adjustment module 1604, the personnel adjustment module 1606, and/or the position adjustment module, either individually or together, impact the probabilities of other guessing markets including those for plays other than the next play, larger game wagers or predictions, and other games. For example, moneyline and spread guesses on the game's outcome, over/under guesses on the game's total score, and certain prop bets, such as will Player A will score a touchdown in the current game.

In an exemplary embodiment, when an adjustment is made to one or more outcomes of a next play, the adjusted expected outcome may be compared to the markets outside of the next play to determine if the adjusted play outcome impacts the identified wider market. For example, an increase in the probabilities of a run may be made based on the safety's and receiver's positioning, the player profiles and tendencies in the context of the game clock, and the number of available timeouts. The identified wider market may be, "Will Player A score a touchdown in the current game?" If Player A is lined up as the outside receiver, this increased likelihood of a run play to him increases the number of opportunities he will have in the current game to score a touchdown. The adjustment based on the alignment of the defense and the game clock may result in a decreased payout offered on the wider market to reflect the greater likelihood that Player A will score a touchdown in the current game. The adjustments made to the wider market may then be stored in a database, for example the clock probabilities database 1612. In some embodiments the updates may further include at least the reasons for changing the probabilities.

Now explaining the clock probabilities database 1612 in may detail. The clock probabilities database 1612 may store all that data that is created in, for example, the execution of the clock base module 1602, the coaching adjustment module 1604, the personnel adjustment module 1606, the position adjustment module 1608, etc. The module may include information on, for example but not limited to, the players, plays, and probabilities for a plurality of plays, games, and/or sports.

Figure 17:
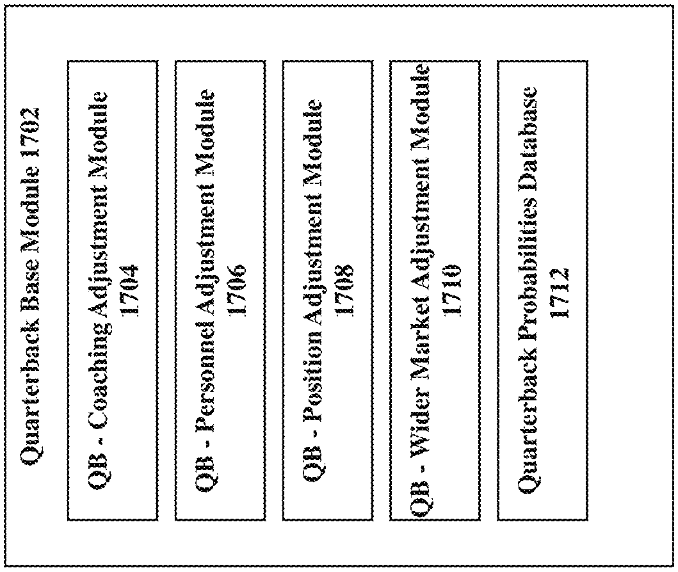
FIG. 17 shows an exemplary system for generating or optimizing probabilities based on the position or positioning of one or more quarterbacks on the field.

In other embodiments a plurality of other factors may be considered in determining probability adjustments. For example, instead of clock rate the modules may instead focus on the position or positioning of one or more quarterbacks on the field. Referring to FIG. 17, an exemplary system for generating or optimizing probabilities based on the position or positioning of one or more quarterbacks on the field 1700 may have a quarterback base module 1702, a QB-coaching adjustment module 1704, a QB-personnel adjustment module 1706, a QB-position adjustment module 1708, a QB-wider market adjustment module 1710, and a quarterback probabilities database 1712.

The modules in the exemplary system for generating or optimizing probabilities based on one or more quarterbacks 1700 may operate and interact in the same fashion as the corresponding modules in the exemplary system for generating or optimizing probabilities based on the clock 1700. Instead of looking at the clock, the system may instead receive information on the position or positioning of the quarterbacks and identify how these factors may impact the probabilities of one or more plays outcomes. For example, in an exemplary embodiment how the quarterback lines up, such as under center or in the shotgun, may impact the probabilities of the play's outcome. The alignment may have a significant impact on the run-pass play selection of the offense. For example, The run rate, the percentage of plays that were a run, of plays with the quarterback under center may be 69%, compared to just 31% from the shotgun alignment. In an exemplary embodiment these averages may serve as the baseline probabilities for a run/pass market on a given play.

Figure 18:
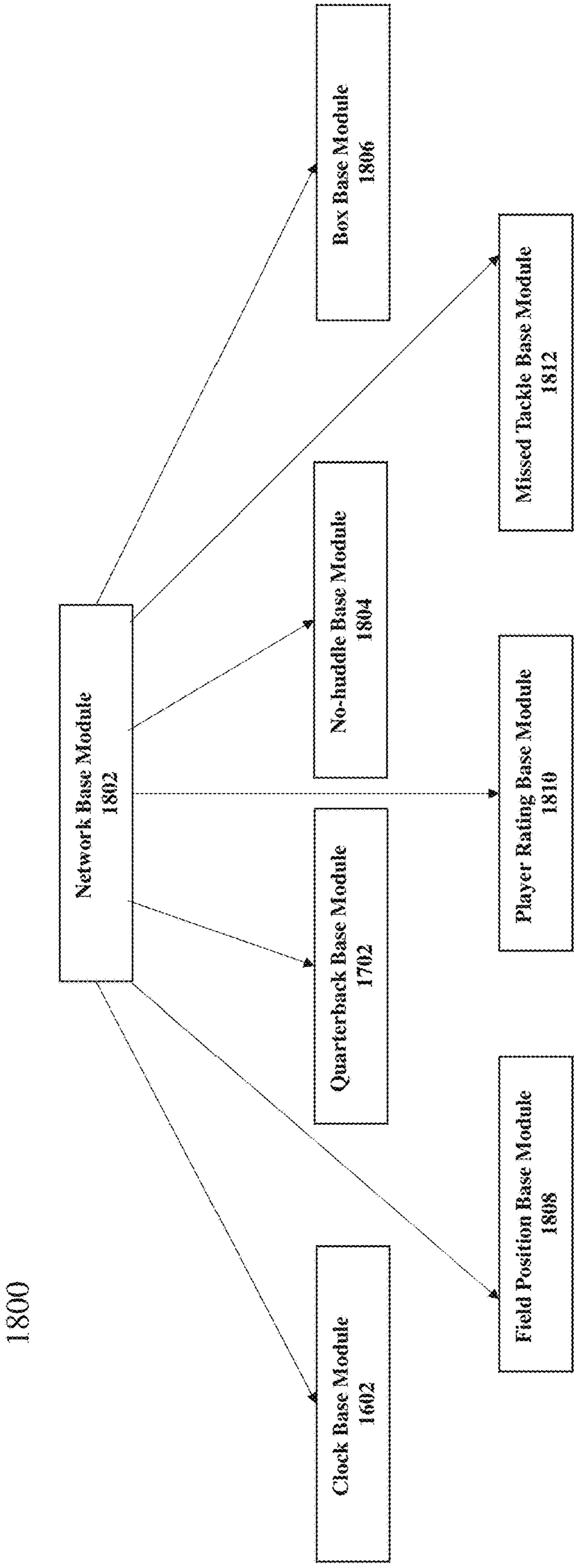
FIG. 18 shows a plurality of exemplary scheme specific base modules.

Referring now to FIG. 18, in some embodiments a plurality of exemplary scheme specific base modules 1800 may be used. Each of the plurality of scheme specific base module 1800 may be called by the network base module 1802. For example, the network base module 1802 may call one or more of the clock base module 1602 a quarterback base module 1702 there may be, a no-huddle base module 1804, a box base module 1806, a field position base module 1808, a player rating base module 1810, and/or a missed tackle base module 1812.

In an exemplary embodiment the no-huddle base module 1804 may optimize or generate probabilities or odds by directing one or more sub-modules to identify factors related to how the offense does or does not utilize a huddle in between plays that may impact the probabilities of the play's outcome. For example, in an embodiment just over 10% of plays may be run without a huddle, and 57% of plays run with a huddle may be passing plays, while 68% of no-huddle plays may be passes. These averages may serve as the baseline probabilities for a run/pass market on a given play.

In an exemplary embodiment the no-huddle base module 1804 may use one or more sub modules to, for example, determine how the coaching staff's tendencies, personnel and play positions drive the probabilities of different outcomes in the guessing markets. The no-huddle base module 1804 may further determine the impact of one or more sub-modules on wider markets, such as plays after the next play and/or plays in other games and may store generated or updated odds in one or more databases.

In an exemplary embodiment the box base module 1806 may optimize or generate probabilities or odds by directing one or more sub-modules to identify factors related to how defense is lined up in the box, which players are in the box, and how that may impact the probabilities of the play's outcome. The box count may be used to define the number of defenders inside the tackle box, and/or within three yards of the line of scrimmage. In an embodiment, a higher box count may correlate to better success rate of passing plays, while a lower box count may correlate to better success with rushing plays. The offenses historical success against the box count may serve as a baseline probabilities for one or more markets on a given play.

In an exemplary embodiment the box base module 1806 may use one or more sub modules to, for example, determine how the coaching staff's tendencies, personnel and play positions drive the probabilities of different outcomes in the guessing markets. The no-huddle base module 1804 may further determine the impact of one or more sub-modules on wider markets, such as plays after the next play and/or plays in other games, and may store generated or updated odds in one or more databases.

In an exemplary embodiment the field position base module 1808 may optimize or generate probabilities or odds by directing one or more sub-modules to identify factors such as where the drive started on the field and whether any explosive drives happened, and how those factors may impact one or more probabilities or odds of a play's outcome. The starting field position on a drive may greatly impact the probabilities of the offense scoring on a given drive. For example, the probabilities of a team scoring may be much lower on a drive that starts on their 10-yard line than on a drive that starts on the opponent's 20-yard line. A play may be considered successful when certain thresholds are reached, for example in a football game a play may be considered successful if at least 40% of the yards to go are covered on first down, 60% of the yards to go on second down, and 100% of the yards to go on third or fourth down. Field position may impact the likelihood of a score on a given drive and the success rate of a given play. For example, the success rate on rushing plays from inside a team's own 20-yard line may be significantly higher than on the opponent's side of the field. The offense's historical success from a given starting field position may serve as the baseline probabilities for a first down market on a given play and the scoring probabilities for a given drive. For each play on the drive, the modules may identify the current field position, starting field position, and if there has been at least one explosive play on the current drive, and may calculate baseline probabilities for a first down market on a given play and the scoring probabilities for a given drive.

In an exemplary embodiment the field position base module 1806 may use one or more sub modules to, for example, determine how the coaching staff's tendencies, personnel and play positions drive the probabilities of different outcomes in the guessing markets. The no-huddle base module 1804 may further determine the impact of one or more sub-modules on wider markets, such as plays after the next play and/or plays in other games and may store generated or updated odds in one or more databases.

In an exemplary embodiment the player rating module 1810 may optimize or generate probabilities or odds by directing one or more sub-modules to identify factors such as, for example, the player ratings of one or more players, the players alignment, and how these may impact the probabilities of a plays outcome. Player skill ratings may be quantified in a variety of fashions, for example for an exemplary football team there may be, for example, a pro football focus's player grade and a football outsiders' defensive-adjusted value over average score. A pass rusher's effectiveness may be quantified based on the percentage of snaps they generate pressure on the opposing quarterback. An offensive lineman's performance may be similarly quantified based on the percentage of time they allow pressure. A defender's ability to cover the pass may be based on the percentage of plays in which they are both playing man-to-man coverage and allow separation above a threshold, for example, one yard of separation between themselves and the receiver they are covering. Zone coverage effectiveness may be quantified based on the break rate or the percentage of times the defender got a good break on a pass. A good break may be, for example, defined as covering at least one-third of the distance to the ball between when the ball is thrown and the ball reaches the receiver. Missed tackles, passes defended, forced fumbles, etc., may be other defensive metrics that could be considered in a player rating. Players in other games, e.g. baseball, soccer, tennis, etc. may have their own rating systems.

In some embodiments, the player ratings may be calculated based on human observations of the plays, identifying the players involved and whether they had a positive or negative impact on the play. Alternatively, and/or in addition, AI may examine sensor data, including video, to grade players on each play. Automated systems could grade effort on a play by, for example, comparing the player's top/average speed on a given play to their top/average recorded speeds.

In some embodiments individual player ratings may be combined to rate position groups, for example a defensive line, linebackers, and/or defensive backs. For example, a linebacker group may have one rating for their ability to stop the run based on a combination of the yards before first contact, missed tackle rate, yards after first contact, explosive play rate, etc. They may be rated for their ability to stop the pass based on a combination of break rate on zone coverage plays, average separation on man coverage plays, average yards after the catch, pressure rate, passer rating when targeted, etc. Position group ratings may be used to adjust the probabilities of next play markets and wider markets within the game.

In an exemplary embodiment the player rating base module 1810 may use one or more sub modules to, for example, determine how the coaching staff's tendencies, personnel and play positions drive the probabilities of different outcomes in the guessing markets. The no-huddle base module 1804 may further determine the impact of one or more sub-modules on wider markets, such as plays after the next play and/or plays in other games, and may store generated or updated odds in one or more databases.

In an exemplary embodiment the missed tackle base module 1812 may optimize or generate probabilities or odds by directing one or more sub-modules to identify factors related to the tackling effectiveness of the teams and players and how that may impact the probabilities of the play's outcome. Tacking effectiveness may be measured in a variety of ways. For example, the missed tackle rate may be (missed tackles/(missed tackles+tackles) of the individual defenders or the defense as a whole. Additional measures may be incorporated to get a more complete understanding of the tackling effectiveness of the defense. For example, one or more of the average yards before first contact on running plays, the average yards after the catch on passing plays, and the average yards after first contact on running plays may be incorporated into a tackling effectiveness rating. The tackling effectiveness rating across all game situations may serve as the baseline probabilities for calculating the probabilities of an explosive play on a given play.

In an exemplary embodiment the context of the game, such as field position, time on the clock, score, etc., may be used to refine the dataset of historical tackling efficiency. Offensive team and player effectiveness may also be incorporated. For example, the missed tackles forced by the offense's potential ball carriers or the average yards after the catch of their potential receivers.

In an exemplary embodiment the missed tackle base module 1812 may use one or more sub modules to, for example, determine how the coaching staff's tendencies, personnel and play positions drive the probabilities of different outcomes in the guessing markets. The no-huddle base module 1804 may further determine the impact of one or more sub-modules on wider markets, such as plays after the next play and/or plays in other games, and may store generated or updated odds in one or more databases.

It may be understood that the above modules may be used alone or in any combination, and in some embodiments additional modules may be used. For example, an exemplary embodiment for a baseball game may use a clock base module, a pitcher module, a player rating module, etc. It may be contemplated that the modules may be implemented in any of a variety of team or individual sports, including but not limited to football, hockey, basketball, baseball, golf, tennis, soccer, cricket, rugby, MMA, boxing, swimming, skiing, snowboarding, horse racing, car racing, boat racing, cycling, wrestling, Olympic sport, etc. It may be further understood that AI may be integrated with any of the modules.

Referring generally to FIGS. 19A-26, The following figures show exemplary graphic displays and various exemplary graphical indicia, which may be understood to be any visual indication used to portray information to a viewer. For purposes of illustration the exemplary figures all show displays with reference to a football game, but in other embodiments the display may be over other team games including, but not limited to, baseball, hockey, softball, volleyball, etc. In yet other embodiments the display may be over 1v1 or single person events including, but not limited to, tennis, track and field, bowling, swimming, etc. Statistics displayed in exemplary displays may be determined by, for example, the probability generation methods discussed above in, for example, FIGS. 1-18. Display information may be dynamically updated in real-time as changes are made in the game (e.g. a player injury, substitutions, changing weather conditions, etc.). In some embodiments the changes may be detected by a detection system on the field, attached to players or equipment, etc. In an exemplary embodiment the detection system may be one or more microchips that may be embedded in the pads of each player to automatically detect player movements or physiological data. In other embodiments the detection system may be a high powered camera systems may be use that are able to detect, for example, player facial expressions, spin on the ball, speed of players or the ball, etc. In yet other embodiments the detection system may be one or more sensors arranged on or around the field. More than one detection system may be used to supplement detection accuracy or speed, or the breadth of data collected.

In some embodiments the graphic display may be on a television program and the same for every viewer. In other embodiments the graphic display may be part of an internet stream and may be watched on, for example but not limited to, a smart TV, a computer, a mobile phone, a tablet, etc. In some embodiments the display may be customized to the particular viewer, based on, for example, previously inputted user preferences, other viewer data such as watch history, and/or integration with, for example, a fantasy sports team. In some embodiments the user may be able to adjust preferences during the game, or may be able to manually select a player, team, position, etc. to follow more closely.

FIGS. 19A-19D show an exemplary pass-run graphic display. Exemplary FIG. 19A may show a pass run statistics display before a play has begun 1900. The pass run statistics display before a play has begun 1900 may show a calculated pass percentage 1902 and a calculated run percentage 1904, for example it may be $2^{nd}$ & 6 in a game between the Buccaneers and the Colts, and the calculated pass percentage 1902 may be 66% and the calculated run percentage 1604 may be 34%. The pass run statistics display before a play has begun 1600 may further show other game information 1906.

Other game information 1906 may include, but is not limited to, one or more of the teams playing, the current score, the teams score in the league/season, the time of the game such as quarter, inning, etc., the down or yards in football, the inning or bases in baseball, etc.

Figure 19A:
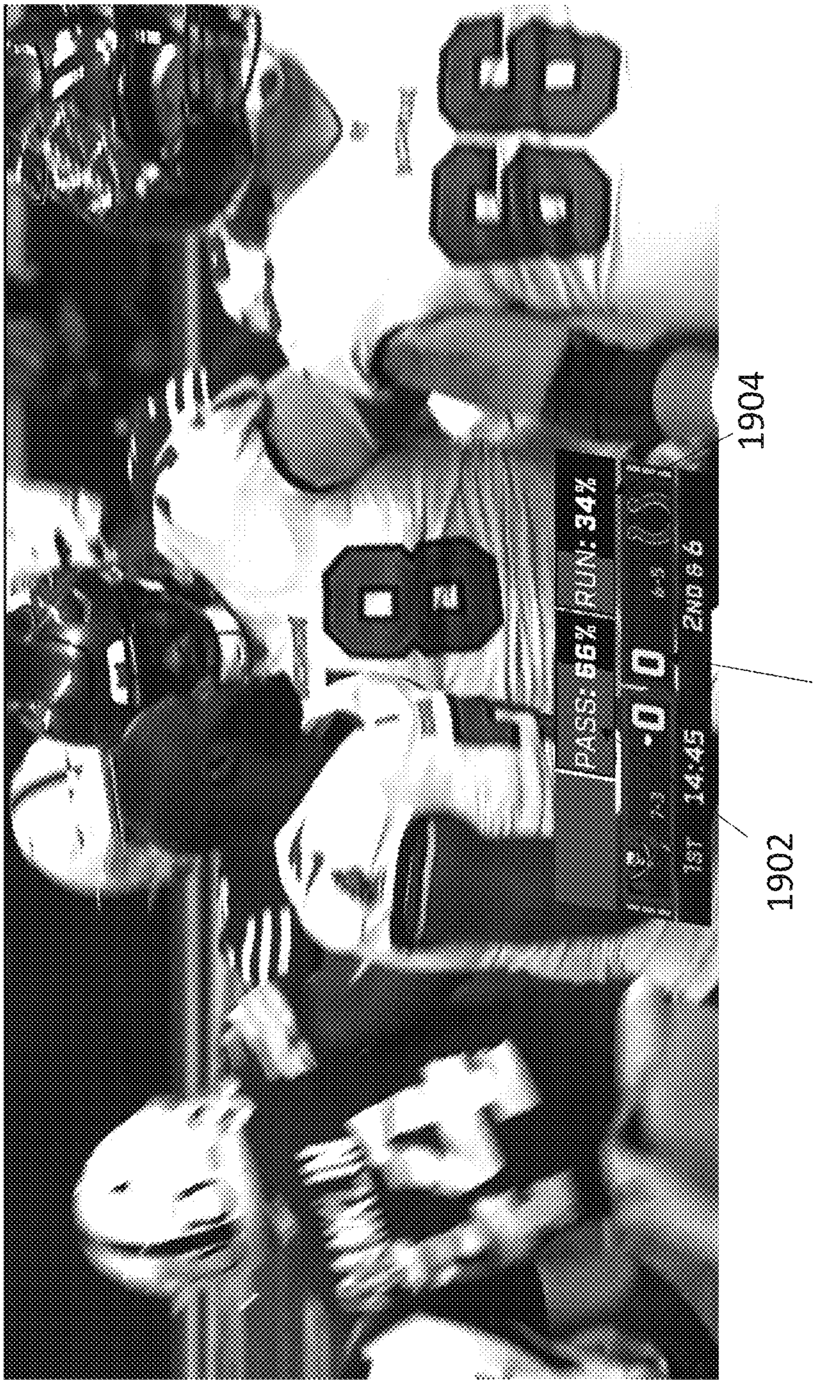
FIGS. 19*a*-19*d* show an exemplary pass-run graphic display.
Figure 19B:
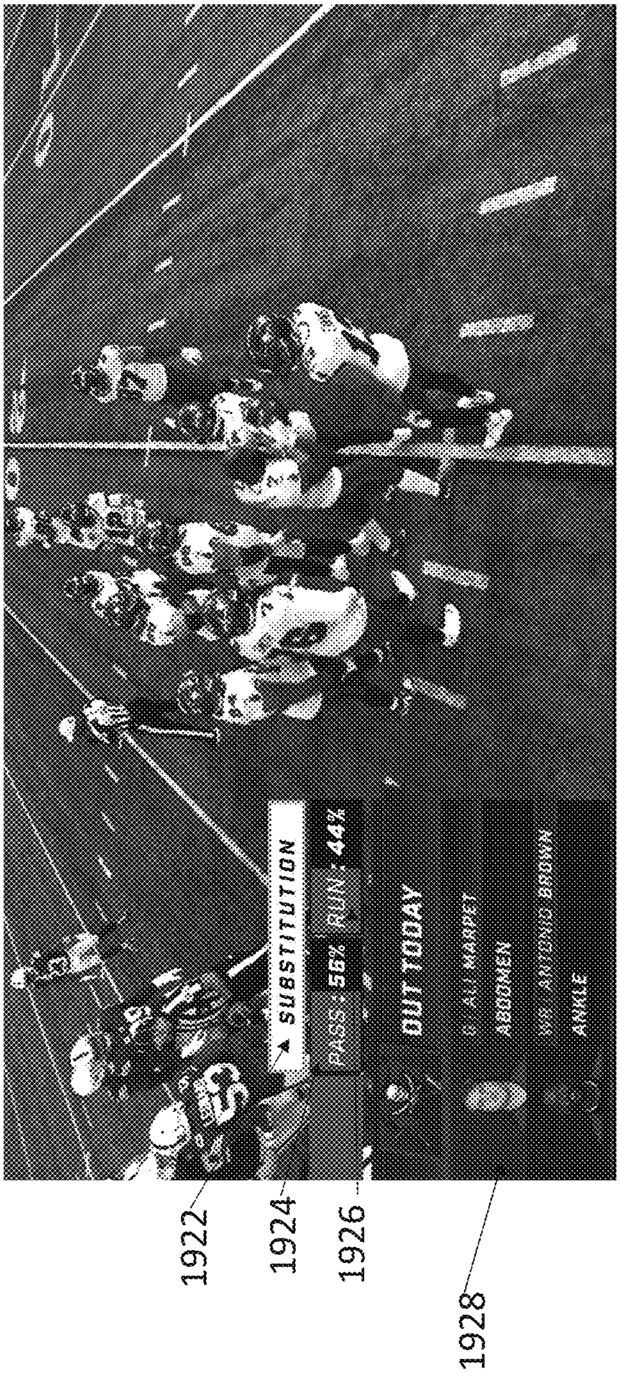

Exemplary FIG. 19B shows a pass run statistics display after a first action 1920. The pass run statistics display after a first action 1920 may show what the first action 1922 is, for example in an exemplary football game between the Buccaneers and the Colts the first action 1922 may be a substitution. The pass run statistics display after a first action 1920 may additionally show updated pass statistics 1924 and updated run statistics 1926, the updated statistics may take into account changes from the first action 1922, for example a certain substitution may increase the chance of the team going for a run. The pass run statistics display after a first action may further show additional information 1928, the additional information 1928 may be any information relevant to the play being made, the overall game, and/or other information related to the sport or league as a whole. For example, the additional information 1928 may show players for one of the team that are out of the game for the day, and the reason why, I.E. abdominal injury, ankle injury, suspension, etc. As another example the additional information 1928 may show news related to one of the teams playing, may show season stats related to a player/team/kind of play etc. may show scores of other current games, etc.

Figure 19C:
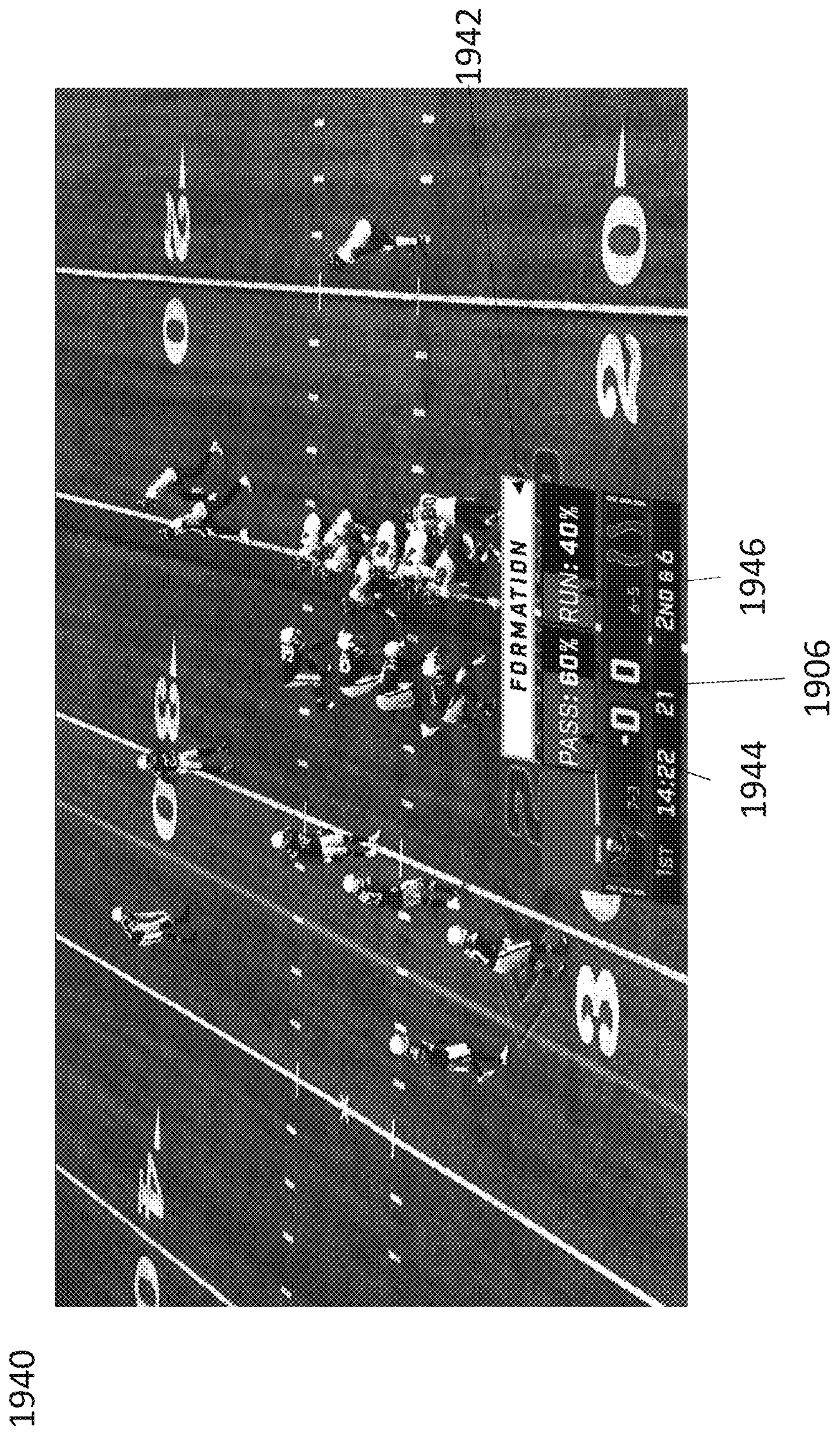
Figure 19D:
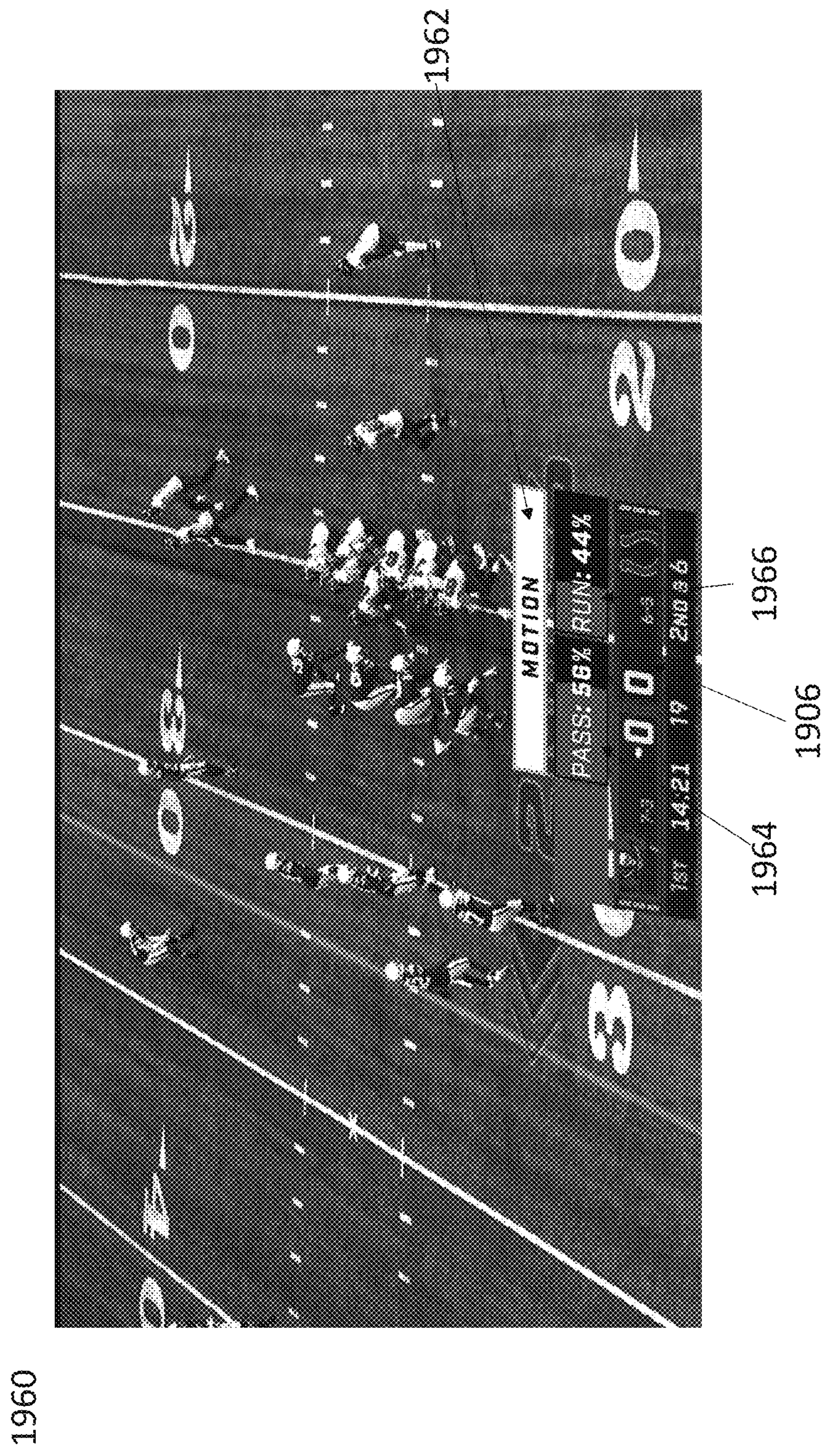

Exemplary FIG. 19C shows a pass run statistics display after a second action 1640. The pass run statistics display after a second action 1940 may show a second action 1942, for example in an exemplary football game between the Buccaneers and the Colts the second action 1942 may be that the players have taken a formation. The pass run statistics display after a second action 1940 may show pass statistics updated after the second action 1944 and run statistics updated after the second action 1946.

Exemplary FIG. 16D shows a pass run statistics display after a third action 1960. The pass run statistics display after a third action 1960 may show a third action 1962, for example in an exemplary football game between the Buccaneers and the Colts the third action 1962 may be that the motion has been detected or that the play has otherwise started. The pass run statistics display after a third action 1960 may show pass statistics updated after the third action 1964 and run statistics updated after the third action 1966.

Figure 20A:
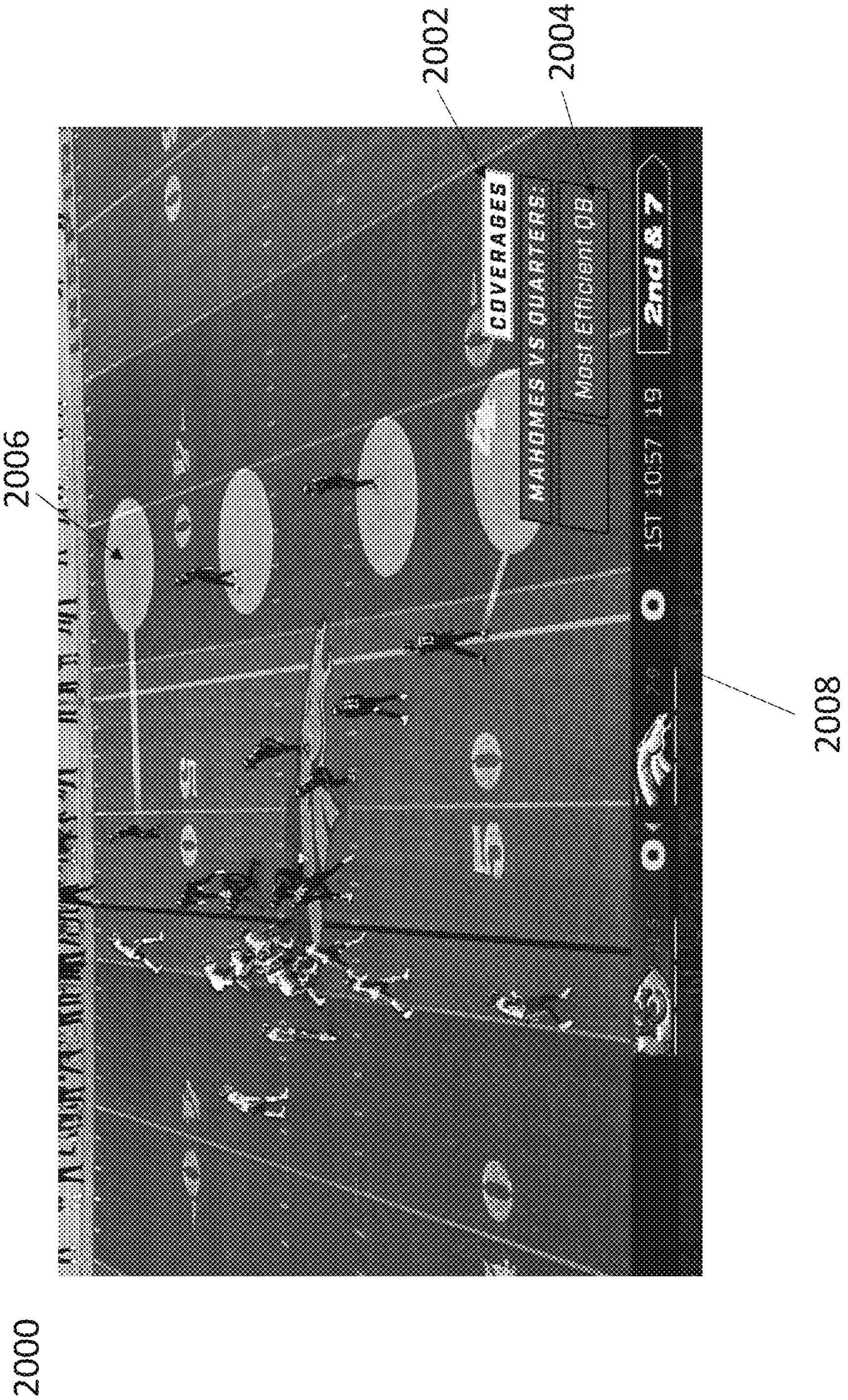
FIGS. 20*a*-20*b* show an exemplary mid-game display.

Exemplary FIG. 20A shows a mid-game display 2000, for example an exemplary most efficient play graphic display. The mid-game display 2000 may highlight a particular aspect of the game 2002, such as, but not limited to, coverages, players to watch, most efficient routes for certain players or positions, player target percentages, etc. In other games different aspects may be highlighted. Additional information 2004 of the particular aspect 2002 may further be shown, for example in the particular aspect 2002 is coverages, the additional information 2004 may specify that the most efficient QB route is being shown. The display may further use graphical elements 2006 in order to overlay live footage, pre-recorded footage, or old footage on a game in order to show the particular aspect 2002 and the additional information 2004. For example, in an exemplary embodiment yellow circles may be used to identify where specific players are likely to move to when the play begins, in other embodiments various colors may be used to signify different things, I.E. a red color shows what the defense is doing while a blue color shows what the offense is doing. In still other embodiments arrows or route lines may be used to show the flow of the game after the play begins or to show multiple possible directions one or more of the teams may go. In some embodiments different colors may be used to signify different plays, I.E. red signifies potential play 1, blue signifies potential play 2, etc. General game information 2008 may also be displayed in addition to the particular aspect of the game 2002.

Figure 20B:
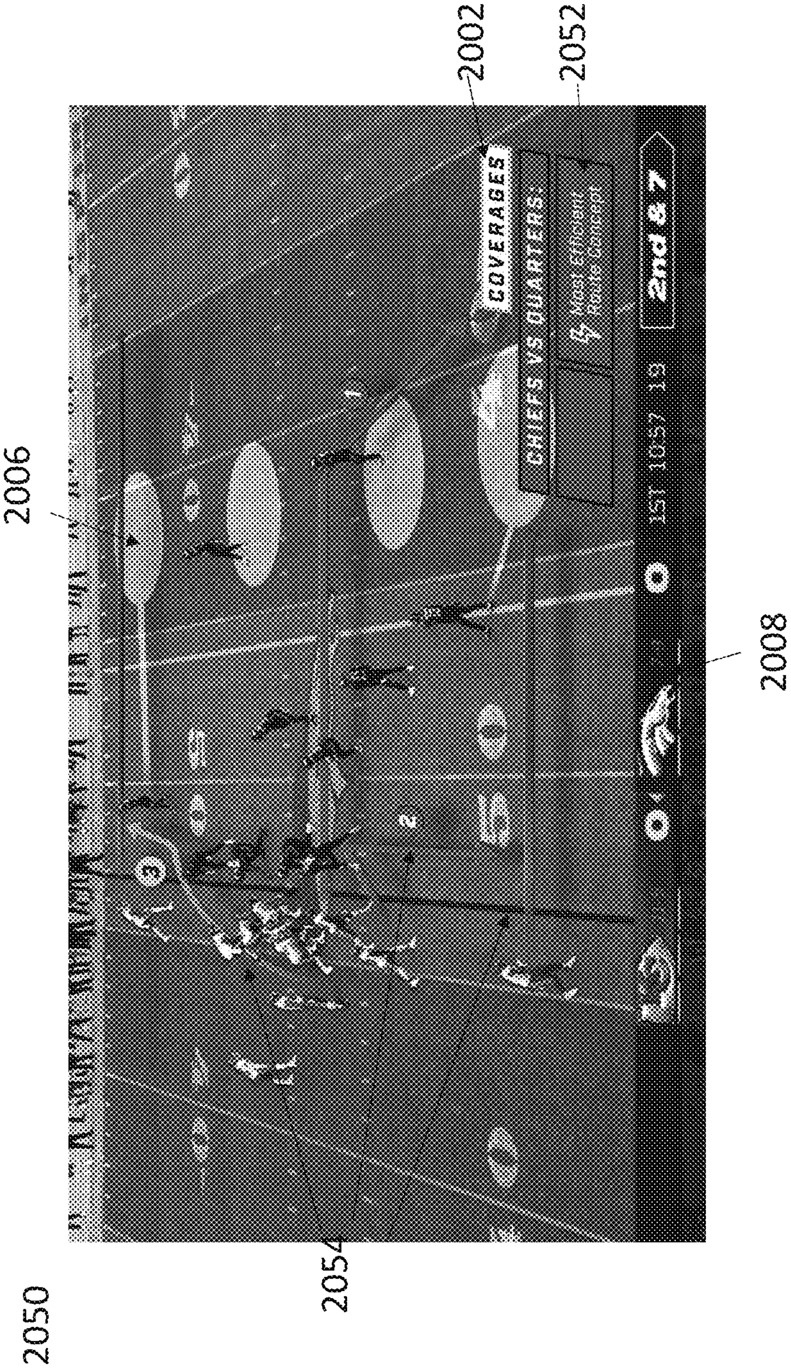

Exemplary FIG. 20B shows a next mid-game display 2050. The next mid-game display 2050 may be an extension of the mid-game display 2000, for example the mid-game display 2000 may be shown for some amount of time, and then after some event, (e.g. a certain amount of time has passed, or a change is requested by a commentator, watcher, determined by A.I., start of the next play is detected, some other movement of players, referee's, etc. are detected) the mid-game display 2000 may switch the next mid-game display 2050. There may be a series of displays that build off of each other, such as a third mid-game display, fourth mid-game display, etc. The next mid-game display may update the additional information 2004 to a new highlighted aspect 2052, for example in an exemplary embodiment it may go from showing the most efficient quarterback to showing most efficient route concepts. The next mid-game display 2050 may further display additional graphical elements 2054, these may be instead of the previous graphical elements 1206 or in addition to the previous graphical elements 2006.

Referring generally to exemplary FIGS. 21A-26, FIGS. 21A-26 display specific embodiments of various midgame displays during an exemplary football game. These embodiments are for the purposes of illustration and example and should not be construed to be limiting. In other embodiments the display may instead show information before or after the game, or during a different game such as, but not limited to, baseball, hockey, volleyball, soccer, etc.

Figure 21A:
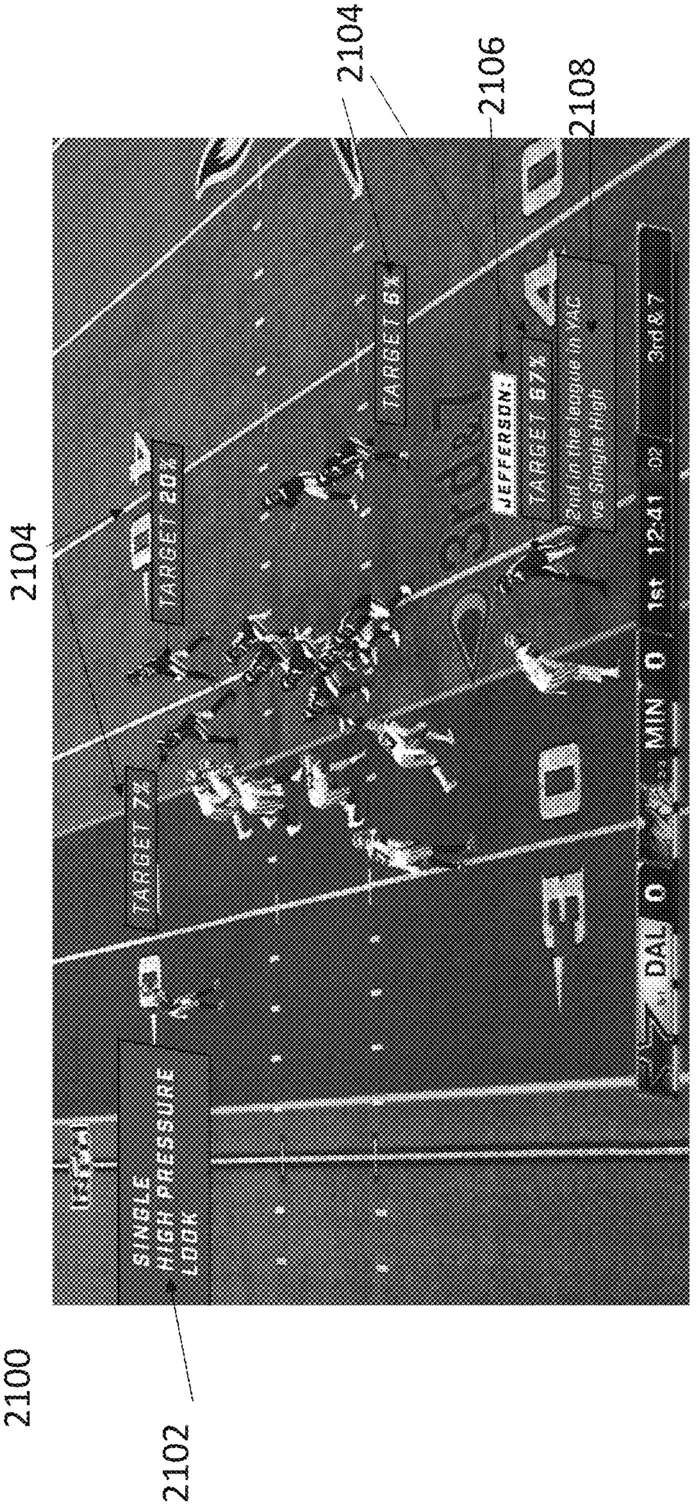
FIGS. 21*a*-21*b* show an exemplary target % graphic display.

Exemplary FIG. 21A may show a target % graphic display 2100. The target % display 2100 may have a title or description 2102 that notifies the viewer what is being shown. The target % graphic display 2100 may identify players and display each identified player's target percentage 2104 based on, for example, AI probability generation as described in, for example, FIGS. 1-15 above. Every identified player's target percentage 2104 may not be displayed, for example only percentages above a certain threshold may be displayed, or only the top percentages, such as the top 5 target percentages, may be displayed. Players of interest may have further information displayed, for example the player with the highest target percentage may be identified as a player of interest, and additional identification 2106 and/or additional player information 2108 may be displayed. In some embodiments multiple players may be considered players of interest and may have additional identification 2106 and/or additional player information 2108 displayed.

Figure 21B:
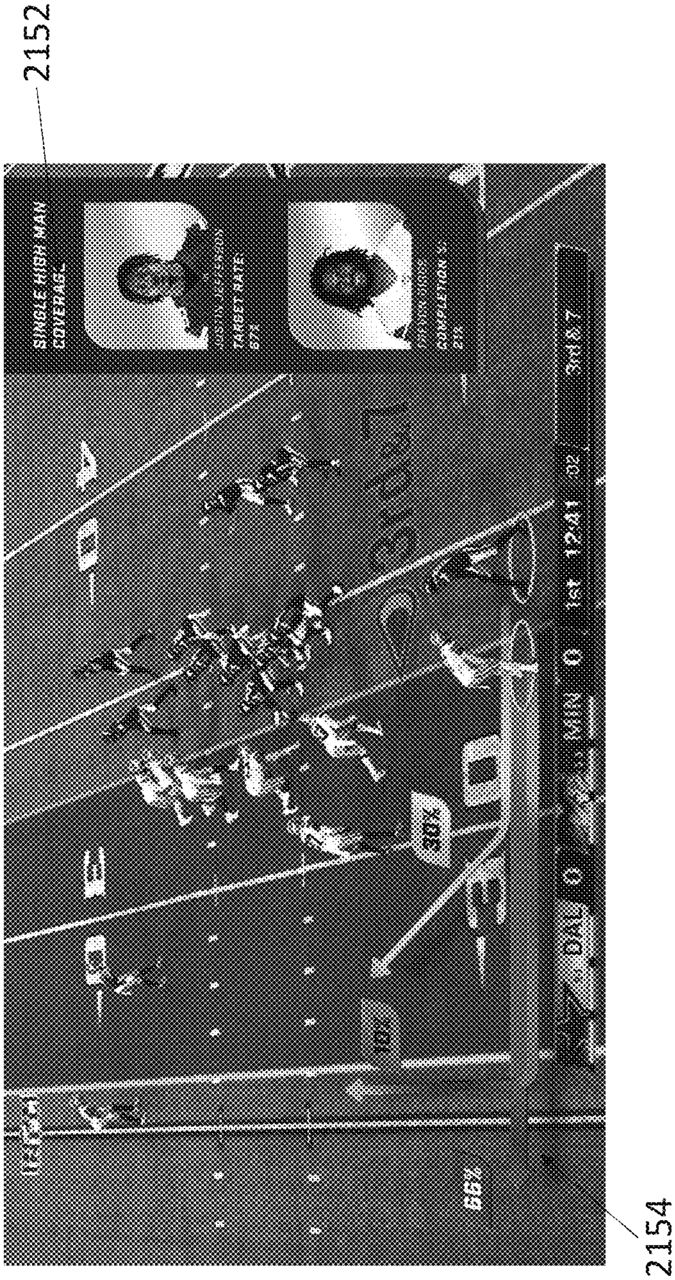

Exemplary FIG. 21B may show a next target % graphic display 2150. The next target % graphic display 2150 may be an extension of the target % graphic display 2100, for example the target % graphic 2100 may be shown for some amount of time, and then after some event, (e.g. a certain amount of time has passed, or a change is requested by a commentator, watcher, determined by A.I., start of the next play is detected, some other movement of players, referee's, etc. are detected) the target % graphic display 2100 may switch the next target % graphic display 2150. There may be a series of displays that build off of each other, such as a third mid-game display, fourth mid-game display, etc. The next target % graphic may, for example, display 2150 may provide an additional information blowout 2152 on one or more players of interest. In some embodiments the next target % graphic display may overlay or replace the graphics of the target % graphic display 2100, for example by displaying likely routes of one or more players 2154.

Figure 22:
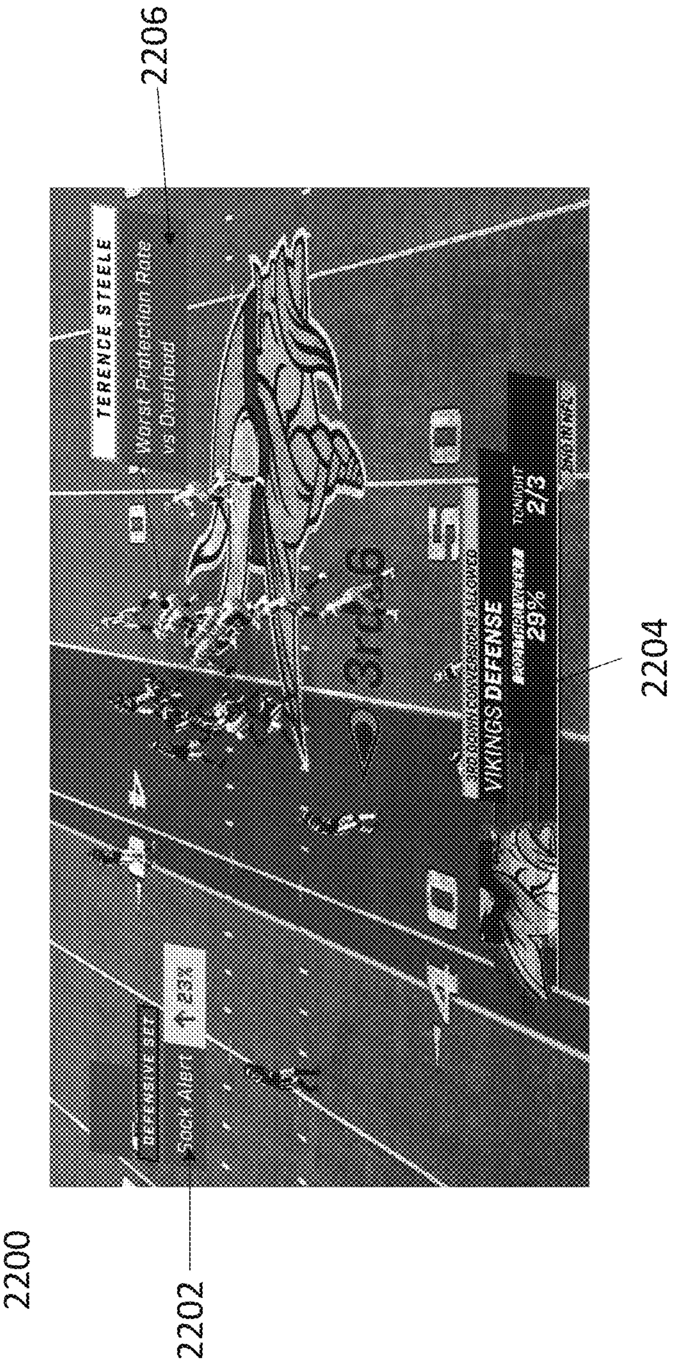
FIG. 22 shows an exemplary sack alert graphic display.

Exemplary FIG. 22 may show an exemplary alert graphic display 2200. The alert graphic display 2200 may identify a significant event or change in gameplay that leads to an alert 2202, for example a previous action, such as the play made or a particular substitution or set of substitutions, may trigger an alert 2202 that a sack is much more likely. The alert 2202 may further give additional information, for example the percentage raise or absolute chance of the alerted event happening. Further team context 2204 may also be displayed, for example showing related stats from the game in question, the season, or the team over a number of years. Further player specific information 2206 may also be displayed, for example if a substitution led to the alert player specific information 2206 may show why the new player led to the alert (e.g. a particular player has a bad protection rate).

Figure 23:
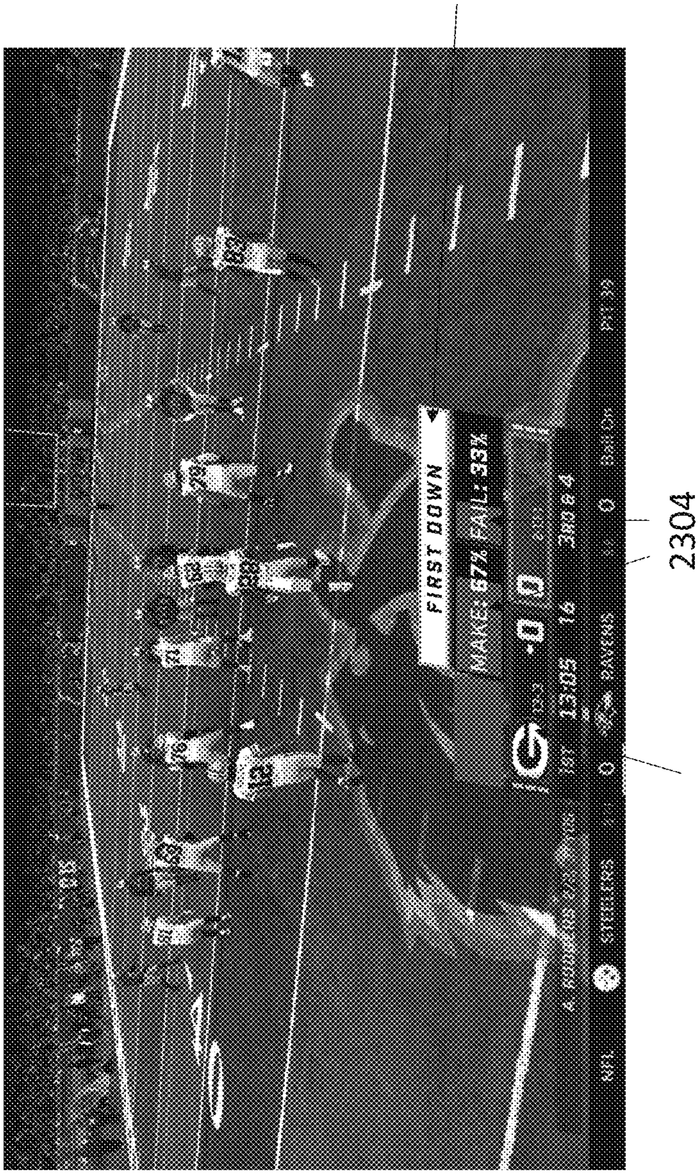
FIG. 23 shows an exemplary first down graphic display.

Exemplary FIG. 23 may show an exemplary first down graphic display 2300. The first down graphic display 2300 may have a title display 2302. The first down graphic display 2300 may further display the probability that the team currently on offense makes it to the next first down 2304. The probabilities 2304 may be updated dynamically in real-time as new information is detected or reported. Additional game and/or team information 2306 such as the current score, the teams record in the league, the time into the game, etc. may additionally be displayed. In some embodiments it may be contemplated that a first down graphic display 2300 may be a default display.

Figure 24:
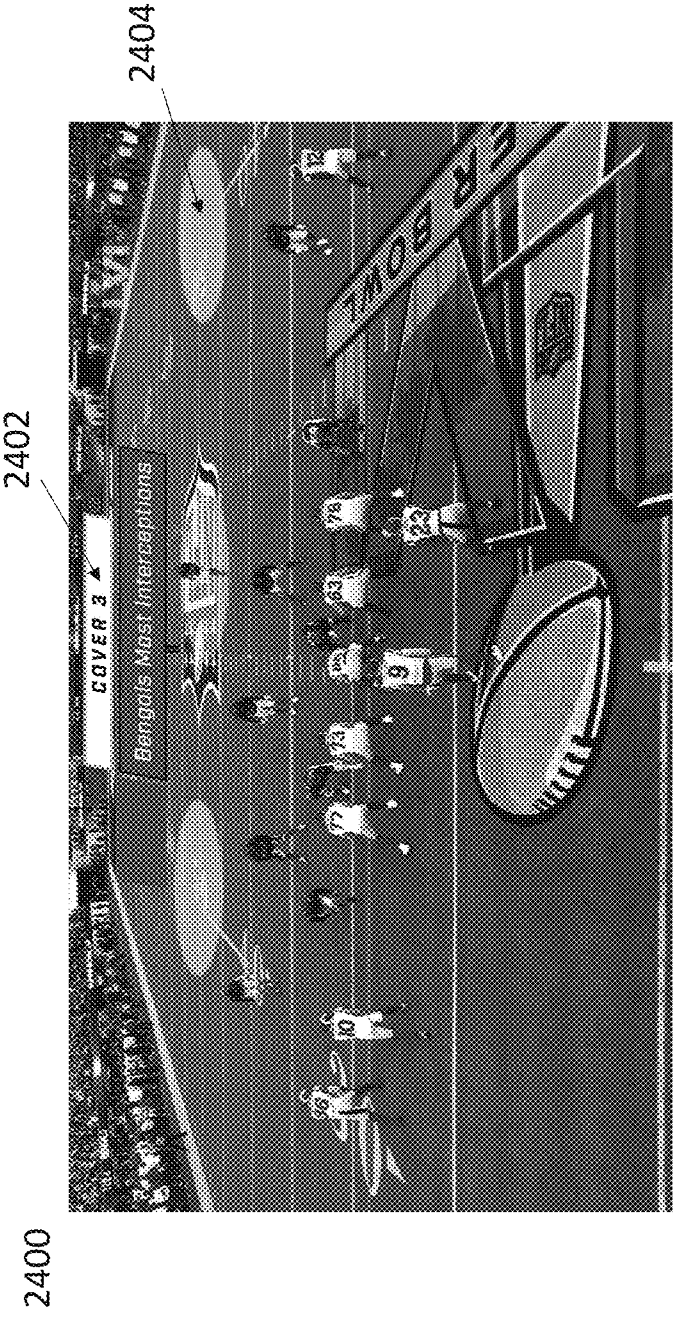
FIG. 24 shows an exemplary cover graphic display.

Exemplary FIG. 24 may show an exemplary cover graphic display 2400. The cover graphic display 2400 may have a title display 2402, which may identify what is being displayed for the user. The cover graphic display 2400 may further have graphical overlays 2404 which may identify and draw attention to particular areas or players of interest.

Figure 25:
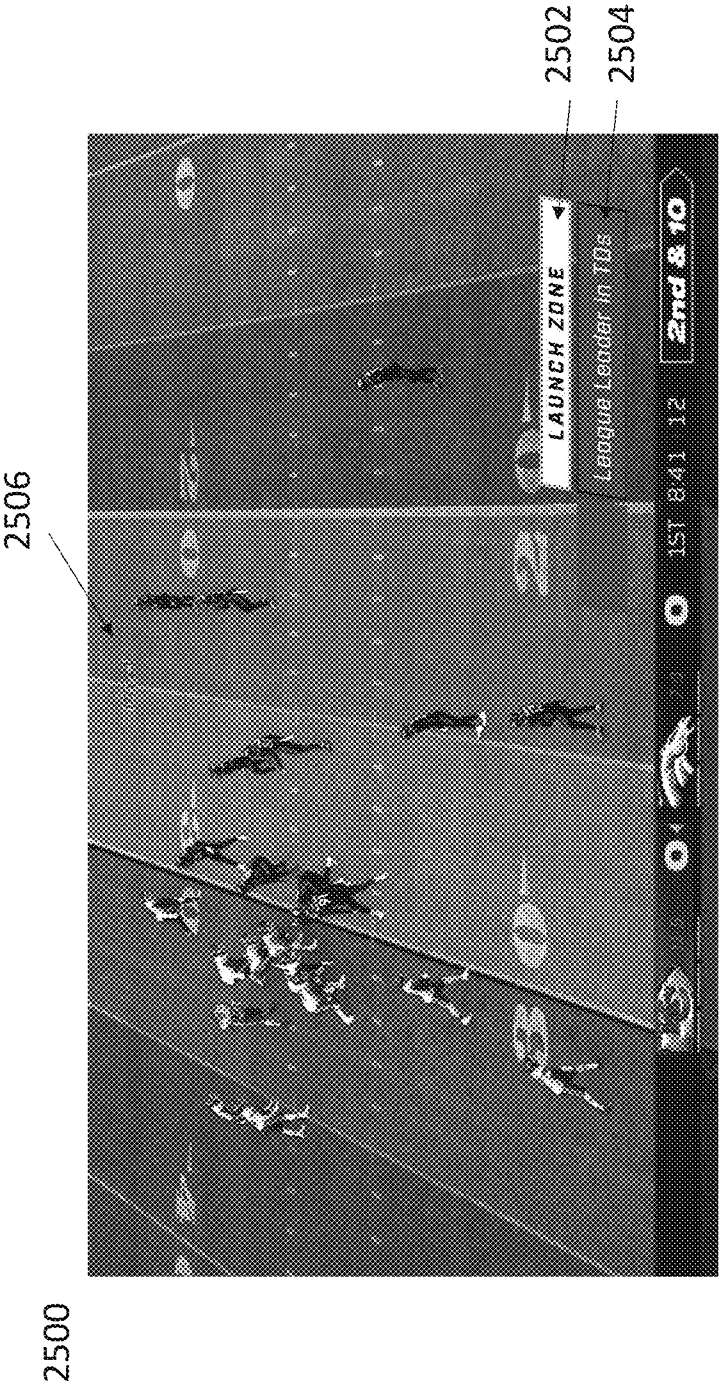
FIG. 25 shows an exemplary launch zone graphic display.

Exemplary FIG. 25 may show an exemplary launch zone graphic display 2500. The launch zone graphic display 2500 may have a title display 2502, which may identify what is being displayed for the user. Additional information of interest 2504 may also be displayed, for example if one of the teams playing is the league leader in TD's. Areas of interest 2506 may be highlighted or otherwise graphically made distinct to draw the viewers eyes to the area of interest 2506. For example if the launch zone is from the 20 yard line to the 30 yard line then that whole area may be highlighted or outlined.

Figure 26:
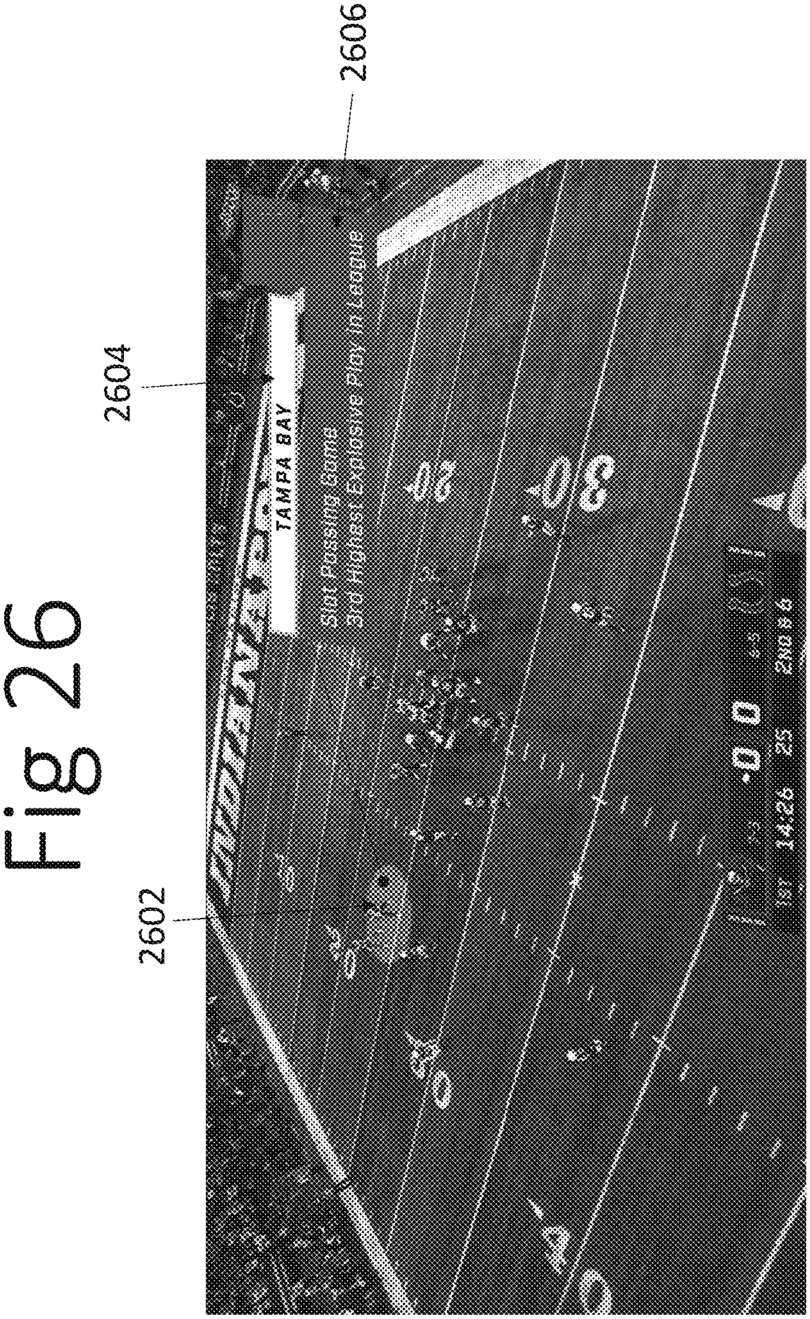
FIG. 26 shows an exemplary highlight graphic display.

Exemplary FIG. 26 may show an exemplary highlight graphic display 2600. The highlight graphic display 2600 may highlight 2602 a particular player or team. The highlight 2602 may be while gameplay is ongoing in real time in order to, for example, help track the location of the football or to track particular players of interest. The highlight 2602 may further provide information including, for example, identification information 2604 (such as the team or player being highlighted), and additional highlight information 2606, which may be used to, for example, provide additional information on why the particular player or team is being highlighted.

In another exemplary embodiment an "in play" game software application may be provided. The "in play" game software may be executed on a user device, for example a computer, phone, tablet, etc., and may be linked to the internet or a cloud that runs software on a prediction network.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for displaying probabilities on a display device, the method comprising steps conducted by a computing device, the steps comprising:

receiving, from at least one sensor located at a live event, situational game data about the live event via a communication network;

determining a game situation based on the situational game data;

calculating a probability of action related to the game situation, wherein calculating the probability comprises artificial intelligence comparing at least a portion of the situational game data to stored data in a historic action database;

displaying graphical indicia comprising the calculated probability on the action related to the game situation on the display device;

periodically receiving new situational game data via the communication network;

dynamically updating the calculated probability and the displayed graphical indicia comprising the calculated probability in real time on the display based on the periodically received new situational game data;

receiving live video feed data of the live event via the communication network; and displaying in real time, on the display device, live video of the live event based on the live video feed data, wherein displaying graphical indicia comprising the calculated probability on the action related to the game situation on the display device comprises overlaying at least a portion of the live video with the graphical indicia;

wherein overlaying the at least the portion of the live video with the graphical indicia further comprises automatically determining at least one player of interest or at least one area of interest based on an update to the calculated probability, automatically identifying the at least one player of interest or at least one area of interest from one of the at least one sensor or the live video feed data, and editing the live video feed by overlaying the live video feed with highlighting provided to the at least one player of interest or at least one area of interest identified based on the update to the calculated probability.

2. The method for displaying probabilities on a display device of claim 1, wherein calculating a probability on an action related to the game situation comprises:

filtering the historic action database to match the action related to the game situation by sequentially performing correlations on each of multiple parameters of the historic action database;

filtering the game data in the historic action database based on the situational game data and one or more schemes;

determining one or more odds or probabilities for the action related to the game situation based on the filtered game data based on the situational game data and the one or more schemes.

3. The method for displaying probabilities on a display device of claim 1, wherein the graphical indicia comprises a display of at least a probability of one or more outcomes of a play.

4. The method for displaying probabilities on a display device of claim 1, the steps conducted by the computing device further comprising determining the at least one player of interest;

wherein the player of interest is a player related to the action related to the game situation; and the graphical indicia comprises at least highlighting one or more of the at least one player of interest.

5. The method for displaying probabilities on a display device of claim 4, wherein highlighting one or more of the at least one player of interest includes at least one of circling or coloring the at least one player of interest.

6. The method for displaying probabilities on a display device of claim 4, wherein the highlighting of the one or more of the at least one player of interest includes at least displaying one of the player's game, season, and career statistics.

7. The method for displaying probabilities on a display device of claim 1, the steps conducted by the computing device further comprising determining at least one team of interest;

wherein the team of interest is a team related to the action related to the game situation; and wherein the graphical indicia comprises at least one of the team's game, season, and career statistics.

8. The method for displaying probabilities on a display device of claim 1, the steps conducted by the computing device further comprising determining the at least one area of interest on a field of play;

wherein the at least one area of interest is an area related to the action related to the game situation; and the graphical indicia comprises at least highlighting one or more of the at least one area of interest on the field of play.

9. The method for displaying probabilities on a display device of claim 1, wherein the live video of the live event comprises footage of the live event.

10. The method for displaying probabilities on a display device of claim 9, wherein the footage of the live event is occurring in substantially real time.

11. The method for displaying probabilities on a display device of claim 1, wherein displaying the graphical indicia comprises:

determining, upon receiving the live video feed data, that the calculated probability on the action is above a threshold, and determining to overlay at least a portion of the live video with the graphical indicia corresponding to the action based on the calculated probability exceeding the threshold; and determining that a second calculated probability on a second action is below the threshold, and determining not to overlay the live video with a further graphical indicia based on the second calculated probability not exceeding the threshold.

12. The method for displaying probabilities on a display device of claim 1, wherein dynamically updating the calculated probability comprises tracking a game clock, performing a comparison of an expected time necessary to execute a strategy to the game clock, and adjusting the calculated probability based on the comparison.

13. The method for displaying probabilities on a display device of claim 1, further comprising detecting, from the situational game data about the live event, a staff composition based on identifying one or more coaches as present and one or more coaches as absent, and wherein calculating the probability comprises using the artificial intelligence to compare trends across different staff compositions.

14. The method for displaying probabilities on a display device of claim 1, comprising detecting, from one of the at least one sensor or the live video feed data, positions of players in a formation; and wherein dynamically updating the calculated probability comprises comparing a first attribute of a first player in the formation and a second attribute of a second player in the formation.

15. The method for displaying probabilities on a display device of claim 14, wherein comparing the first attribute and the second attribute further comprises selecting the first player and the second player from the players of the formation for comparison, said selection based on the first player being detected as being at a first position and the second player being detected as being at a second position.

16. The method for displaying probabilities on a display device of claim 1, comprising measuring, from one of the at least one sensor or the live video feed data, at least one performance attribute of at least one player; and wherein comparing the at least the portion of the situational game data to the stored data in the historic action database comprises comparing the at least one performance attribute to a top recorded performance attribute for the at least one player.

17. The method for displaying probabilities on a display device of claim 1, comprising monitoring, from one of the at least one sensor or the live video feed data, whether motion is detected to determine whether a play has started; and triggering dynamic updating based on determination that the play has started.

18. The method for displaying probabilities on a display device of claim 1, comprising determining whether to replace the graphical indicia with a second graphical indicia based on a detected event, and, based on the detected event, replacing the graphical indicia with the second graphical indicia.

19. The method for displaying probabilities on a display device of claim 18, wherein the detected event is an indicator of a start of a play, and wherein replacing the graphical indicia comprises replacing a player-related graphical indicia overlaid on the live video at a first location with a play-related graphical indicia overlaid on the live video at a second location.

20. The method for displaying probabilities on a display device of claim 1, comprising triggering, based on detection of an event and comparison of an expected result of the event to a threshold, an alert, and displaying the alert in an area of the live video separate from the graphical indicia.

* * * * *